(12) United States Patent
Rusak et al.

(10) Patent No.: US 10,861,440 B2
(45) Date of Patent: Dec. 8, 2020

(54) UTTERANCE ANNOTATION USER INTERFACE

(71) Applicant: Microsoft Technology Licensing, LLC, Redmond, WA (US)

(72) Inventors: Jesse Daniel Eskes Rusak, Somerville, MA (US); Percy Shuo Liang, Stanford, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 137 days.

(21) Appl. No.: 16/230,536

(22) Filed: Dec. 21, 2018

(65) Prior Publication Data

US 2019/0244601 A1 Aug. 8, 2019

Related U.S. Application Data

(60) Provisional application No. 62/626,344, filed on Feb. 5, 2018.

(51) Int. Cl.
*G10L 15/00* (2013.01)
*G10L 15/06* (2013.01)
*G10L 15/08* (2006.01)
*G10L 15/22* (2006.01)
*G10L 15/26* (2006.01)

(52) U.S. Cl.
CPC ............ *G10L 15/063* (2013.01); *G10L 15/08* (2013.01); *G10L 15/22* (2013.01); *G10L 15/26* (2013.01); *G10L 2015/088* (2013.01); *G10L 2015/225* (2013.01)

(58) Field of Classification Search
CPC ........................................................ G10L 15/00
USPC .............. 704/243, 254, 270, 235, 267, 249; 715/708; 705/3
See application file for complete search history.

(56) References Cited

U.S. PATENT DOCUMENTS

| | | | |
|---|---|---|---|
| 6,173,266 B1 * | 1/2001 | Marx | G10L 15/22 704/270 |
| 7,383,172 B1 * | 6/2008 | Jamieson | G06F 40/30 704/9 |
| 8,001,469 B2 * | 8/2011 | Weng | G06F 8/30 715/708 |

(Continued)

*Primary Examiner* — Michael Colucci
(74) *Attorney, Agent, or Firm* — Alleman Hall Creasman & Tuttle LLP

(57) ABSTRACT

A computing device includes a display configured to present a graphical user interface. The graphical user interface includes a transcript portion configured to display an unannotated transcript representing an ordered sequence of one or more dialogue events involving a client and a computerized assistant, at least one of the dialogue events taking the form of an example client utterance, and an annotation portion configured to display a hierarchical menu including a plurality of candidate utterance annotations. An utterance annotation machine is configured to receive one or more computer inputs selecting, for each of one or more response parameters in the example client utterance, utterance annotations from the hierarchical menu that collectively define a machine-readable interpretation of the example client utterance. An annotated utterance having a predetermined format usable to train the computerized assistant is output to a data store based on the example client utterance.

20 Claims, 19 Drawing Sheets

(56) References Cited

U.S. PATENT DOCUMENTS

| | | | | |
|---|---|---|---|---|
| 8,583,439 B1* | 11/2013 | Kondziela | ............... | G10L 15/22 |
| | | | | 704/267 |
| 9,185,225 B1* | 11/2015 | Vance | ................ | H04M 3/53333 |
| 9,318,128 B1* | 4/2016 | Epstein | ................... | G10L 21/10 |
| 2002/0091528 A1* | 7/2002 | Daragosh | ................ | G10L 15/30 |
| | | | | 704/270.1 |
| 2004/0243407 A1* | 12/2004 | Yu | ......................... | G06F 40/295 |
| | | | | 704/240 |
| 2005/0057570 A1* | 3/2005 | Cosatto | ................... | G06T 13/40 |
| | | | | 345/473 |
| 2010/0306214 A1* | 12/2010 | Paparizos | ............. | G06F 16/951 |
| | | | | 707/759 |
| 2011/0055256 A1* | 3/2011 | Phillips | ................... | G10L 15/30 |
| | | | | 707/769 |
| 2011/0231191 A1* | 9/2011 | Miyazaki | ........... | G01C 21/3608 |
| | | | | 704/243 |
| 2014/0058724 A1* | 2/2014 | Barve | ..................... | G06F 40/10 |
| | | | | 704/9 |
| 2014/0188509 A1* | 7/2014 | Palestrant | .............. | G16H 40/20 |
| | | | | 705/3 |
| 2014/0297282 A1* | 10/2014 | Peters | ..................... | G10L 15/19 |
| | | | | 704/254 |
| 2014/0350933 A1* | 11/2014 | Bak | ..................... | G10L 15/1822 |
| | | | | 704/249 |
| 2015/0066479 A1* | 3/2015 | Pasupalak | ........... | G06F 16/9535 |
| | | | | 704/9 |
| 2015/0242385 A1* | 8/2015 | Bao | ....................... | G06F 40/211 |
| | | | | 704/9 |
| 2015/0348551 A1* | 12/2015 | Gruber | .................... | G10L 15/28 |
| | | | | 704/235 |
| 2017/0256256 A1* | 9/2017 | Wang | .................... | G10L 15/265 |
| 2017/0352352 A1* | 12/2017 | Wang | .................... | G10L 25/72 |
| 2018/0308476 A1* | 10/2018 | Hirzel | .................. | G06F 40/247 |

* cited by examiner

400

```
┌─────────────────────────────────────────────────────────────────┐
│ LOAD COMPUTER-READABLE TRANSCRIPT REPRESENTING ORDERED          │
│ SEQUENCE OF ONE OR MORE DIALOGUE EVENTS                         │
│                                                             402 │
└─────────────────────────────────────────────────────────────────┘
                                 │
                                 ▼
┌─────────────────────────────────────────────────────────────────┐
│ ACQUIRE COMPUTER-READABLE COMMAND PARAMETRIZED BY SEED          │
│ SEMANTIC PARAMETER AND DESCRIBING EXEMPLARY ORDERED             │
│ SUBSEQUENCE OF ONE OR MORE DIALOGUE EVENTS FROM                 │
│ TRANSCRIPT                                                  404 │
└─────────────────────────────────────────────────────────────────┘
                                 │
                                 ▼
┌─────────────────────────────────────────────────────────────────┐
│ ACQUIRE ALTERNATIVE SEMANTIC PARAMETER DIFFERING FROM SEED      │
│ SEMANTIC PARAMETER AND REPARAMETRIZING COMPUTER-READABLE        │
│ COMMAND BY REPLACING SEED SEMANTIC PARAMETER WITH               │
│ ALTERNATIVE SEMANTIC PARAMETER                              406 │
└─────────────────────────────────────────────────────────────────┘
                                 │
                                 ▼
┌─────────────────────────────────────────────────────────────────┐
│ GENERATE ALTERNATIVE ORDERED SUBSEQUENCE OF ONE OR MORE         │
│ DIALOGUE EVENTS BASED ON COMPUTER-READABLE COMMAND AND          │
│ ALTERNATIVE SEMANTIC PARAMETER                              408 │
└─────────────────────────────────────────────────────────────────┘
                                 │
                                 ▼
┌─────────────────────────────────────────────────────────────────┐
│ OUTPUT, TO DATA STORE, AN ALTERNATIVE COMPUTER-READABLE         │
│ TRANSCRIPT INCLUDING ALTERNATIVE ORDERED SUBSEQUENCE OF         │
│ DIALOGUE EVENTS, AND HAVING PREDETERMINED FORMAT USEABLE        │
│ TO TRAIN COMPUTERIZED ASSISTANT                             410 │
└─────────────────────────────────────────────────────────────────┘
```

FIG. 4

```
                                                    500
                  ┌─────────────────────────────────────────────────┐
                  │   LOAD COMPUTER-READABLE SEED COMMAND      502  │
                  │  DESCRIBING AN ORDERED SEQUENCE OF TWO OR MORE  │
                  │          TOP-LEVEL DIALOGUE EVENTS              │
                  │  ┌───────────────────────────────────────────┐  │
                  │  │ DIALOGUE EVENT INCLUDES CLIENT UTTERANCE OR COMPUTER │  │
                  │  │           ASSISTANT RESPONSE              │  │
                  │  │                                     504   │  │
                  │  └───────────────────────────────────────────┘  │
                  │  ┌───────────────────────────────────────────┐  │
                  │  │ SEED COMMAND INCLUDES ONE OR MORE SUB-COMMANDS, EACH │
                  │  │   CORRESPONDING TO PORTION OF ORDERED SEQUENCE OF    │
                  │  │              DIALOGUE EVENTS              │  │
                  │  │                                     506   │  │
                  │  └───────────────────────────────────────────┘  │
                  │  ┌───────────────────────────────────────────┐  │
                  │  │      FOCAL SUB-COMMAND IS PARAMETRIZED    │  │
                  │  │           BY SEED SEMANTIC PARAMETER      │  │
                  │  │                                     508   │  │
                  │  └───────────────────────────────────────────┘  │
                  └─────────────────────────────────────────────────┘
```

Flowchart 500:

502 — LOAD COMPUTER-READABLE SEED COMMAND DESCRIBING AN ORDERED SEQUENCE OF TWO OR MORE TOP-LEVEL DIALOGUE EVENTS

504 — DIALOGUE EVENT INCLUDES CLIENT UTTERANCE OR COMPUTER ASSISTANT RESPONSE

506 — SEED COMMAND INCLUDES ONE OR MORE SUB-COMMANDS, EACH CORRESPONDING TO PORTION OF ORDERED SEQUENCE OF DIALOGUE EVENTS

508 — FOCAL SUB-COMMAND IS PARAMETRIZED BY SEED SEMANTIC PARAMETER

↓

510 — RE-PARAMETRIZE FOCAL SUB-COMMAND BY OUTPUTTING PLURALITY OF DIFFERENT RE-PARAMETRIZED FOCAL SUB-COMMANDS, WHERE IN EACH FOCAL SUB-COMMAND, SEED SEMANTIC PARAMETER IS REPLACED BY ONE OF PLURALITY OF DIFFERENT SYNTHETIC SEMANTIC PARAMETERS

512 — FOCAL SUB-COMMAND INCLUDES FURTHER LAYER OF FURTHER SUB-COMMANDS, AND RE-PARAMETRIZING FOCAL SUB-COMMAND INCLUDES RE-PARAMETRIZING FURTHER SUB-COMMANDS

↓

514 — FOR EACH SYNTHETIC SEMANTIC PARAMETER: SAVE CORRESPONDING RE-PARAMETRIZED FOCAL SUB-COMMAND

TRANSCRIPT PORTION 905A

Hey computer!

Hello, how can I help you?

*Will it be sunny tomorrow?* — 911

PARAPHRASE INPUT AREA 912

| REPHRASE #1 OF "Will it be sunny tomorrow?" | Will we get any sunshine tomorrow? 913A |

| REPHRASE #2 OF "Will it be sunny tomorrow?" | Is it going to be sunny out in the morning? 913B |

| REPHRASE #3 OF "Will it be sunny tomorrow?" | Will the weather be sunny tomorrow? 913C |

910

1000

```
┌─────────────────────────────────────────────────────────┐
│  GRAPHICALLY DISPLAY AN UNANNOTATED TRANSCRIPT          │
│  REPRESENTING AN ORDERED SEQUENCE OF ONE OR MORE DIALOGUE│
│  EVENTS INCLUDING AN EXAMPLE CLIENT UTTERANCE           │
│                                                    1002 │
└─────────────────────────────────────────────────────────┘
                            │
                            ▼
┌─────────────────────────────────────────────────────────┐
│  GRAPHICALLY DISPLAY A HIERARCHICAL MENU INCLUDING A    │
│  PLURALITY OF CANDIDATE UTTERANCE ANNOTATIONS           │
│                                                    1004 │
└─────────────────────────────────────────────────────────┘
                            │
                            ▼
┌─────────────────────────────────────────────────────────┐
│  RECEIVE ONE OR MORE COMPUTER INPUTS SELECTING ONE OR MORE│
│  UTTERANCE ANNOTATIONS FROM THE HIERARCHICAL MENU       │
│  COLLECTIVELY DEFINING A MACHINE-READABLE INTERPRETATION OF│
│  THE EXAMPLE CLIENT UTTERANCE                           │
│                                                    1006 │
└─────────────────────────────────────────────────────────┘
                            │
                            ▼
┌─────────────────────────────────────────────────────────┐
│  OUTPUT AN ANNOTATED UTTERANCE BASED ON THE EXAMPLE CLIENT│
│  UTTERANCE AND EACH OF THE ONE OR MORE SELECTED UTTERANCE│
│  ANNOTATIONS                                            │
│                                                    1008 │
└─────────────────────────────────────────────────────────┘
```

FIG. 10

UTTERANCE ANNOTATION USER INTERFACE

CROSS REFERENCE TO RELATED APPLICATIONS

This application claims priority to U.S. Provisional Patent Application Ser. No. 62/626,344, filed Feb. 5, 2018, the entirety of which is hereby incorporated herein by reference for all purposes.

BACKGROUND

Machine learning techniques allow computing devices to make decisions or perform operations based on models that can be trained from examples. "Supervised" machine learning relies on a body of training data that is often manually labeled. Based on the labeled training data, a mathematical model can be built that allows the computing device to perform operations on novel data not found in the body of training data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A computing device includes a display configured to present a graphical user interface. The graphical user interface includes a transcript portion configured to display an unannotated transcript representing an ordered sequence of one or more dialogue events involving a client and a computerized assistant, at least one of the dialogue events taking the form of an example client utterance, and an annotation portion configured to display a hierarchical menu including a plurality of candidate utterance annotations. An utterance annotation machine is configured to receive one or more computer inputs selecting, for each of one or more response parameters in the example client utterance, utterance annotations from the hierarchical menu that collectively define a machine-readable interpretation of the example client utterance. An annotated utterance having a predetermined format usable to train the computerized assistant is output to a data store based on the example client utterance.

BRIEF DESCRIPTION OF THE DRAWINGS

FIG. 4 illustrates an example method for training a natural language system.

FIG. 5 illustrates an example method for generating synthetic training data for a computerized assistant.

FIGS. 7-9 illustrate synthetic dialogues generated for use as training data.

FIG. 10 illustrates an example method for utterance annotation.

DETAILED DESCRIPTION

Figure 1:
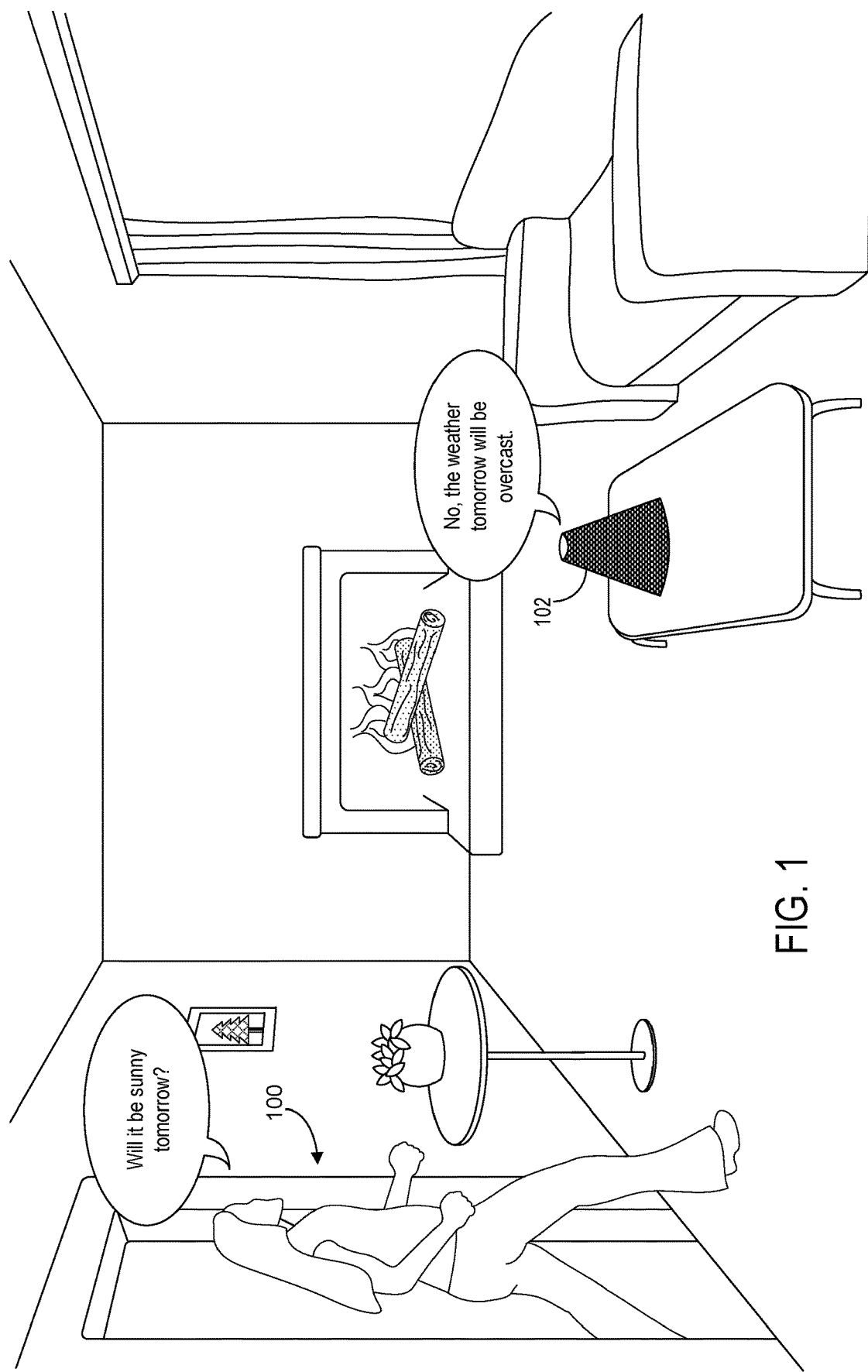
FIG. 1 illustrates an interaction between a client and a computerized assistant.

Computerized assistants may include logic that is configured to respond to natural language queries or commands. For instance, a computerized assistant may be configured to respond to a weather query by accessing a remote weather service and audibly disclosing information pertaining to the query using natural language. This is illustrated in FIG. 1, in which an example user 100 speaks an utterance "Will it be sunny tomorrow?" An example computerized assistant device 102 detects the utterance, interprets it, queries a remote service to find the requested information, and responds by stating "No, the weather tomorrow will be overcast."

Because there are any number of ways that a human user may choose to phrase a particular command or query, computerized assistants are often trained using machine learning. For example, supervised machine learning may be used to build a body of training data including various client utterances (e.g., natural language queries or commands), as well as manually-provided annotations that define computer-readable interpretations of the client utterances. Client utterances include any combinations of human language words on which a computerized assistant may be trained, and may be human-generated (e.g., written or spoken) or computer-generated. Through annotation of such utterances, a model can be built that allows a computerized assistant to respond to novel utterances that were not included in the body of training data.

To achieve acceptable results using this approach, it is typically necessary to accumulate large numbers (e.g., thousands or millions) of annotated utterances to build the body of training data. As such, annotation of training inputs may be crowdsourced to large groups of human annotators. Furthermore, annotation of training data is a technical task that frequently requires annotator expertise, e.g., a background in computer programming to properly perform. This requirement limits the pool of individuals who can serve as annotators, which makes it more difficult to accumulate a suitable body of training data.

Accordingly, the disclosed training pipeline may be used to automatically generate training data. The training pipeline includes machines for acquiring training data in the form of exemplary dialogues and annotations for the dialogues, as well as machines for automatically generating variants of the dialogues to expand coverage of the training data. The training pipeline may include a computing device that presents an utterance annotation interface through which example client utterances may be annotated in an intuitive and user-friendly manner. Specifically, the utterance annotation interface may include a transcript portion in which an unannotated transcript of one or more dialogue events is displayed. The dialogue events may include, for example, example client utterances (e.g., natural language commands or queries), as well as computerized assistant responses to such utterances. The utterance annotation interface may include an annotation portion that in turn includes a hierarchical menu of candidate utterance annotations. By interacting with this hierarchical menu, a human annotator having relatively little experience in machine learning may select utterance annotations that, for a given example client utterance, define a computer-readable interpretation of the utterance. An annotated utterance may then be output to a data store and used for training a computerized assistant.

In this manner, the herein-described training pipeline and utterance annotation interface improves over conventional computerized approaches for annotating training data which, as discussed above, typically require human annotators to have extensive expertise and/or or programming experience. As a practical result, a body of training data for training a computerized assistant (or other application that relies on machine learning) may be more quickly and efficiently accumulated. This in turn improves the performance of the computerized assistant.

Figure 2:
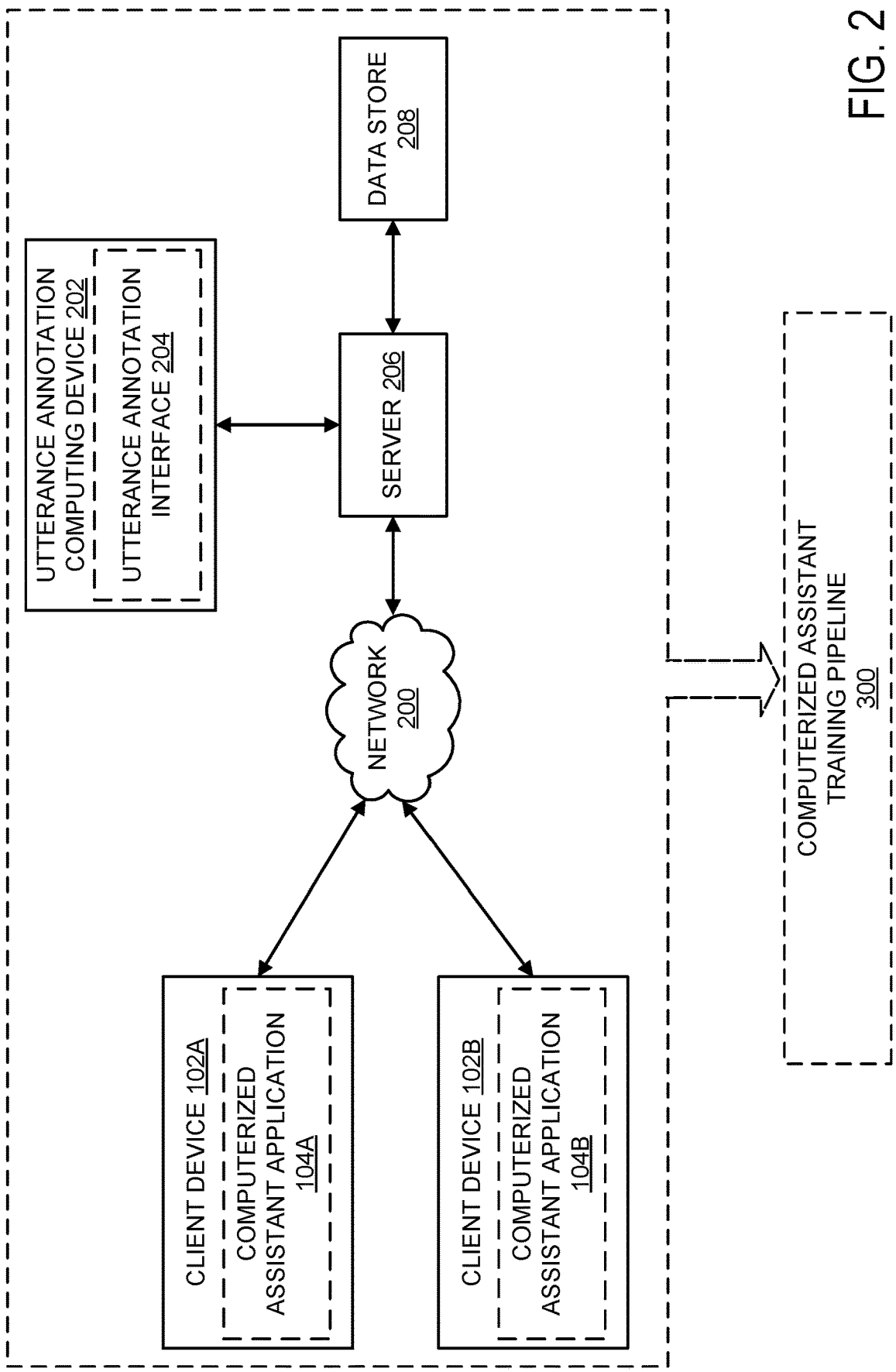
FIG. 2 schematically illustrates an example network environment including a computerized assistant.

FIG. 2 schematically illustrates an example network environment in which a computerized assistant may be implemented. Client devices 102A and 102B are personal computing devices belonging to human users of the computerized assistant. Client devices 102A and 102B may have any suitable form factor and hardware configuration. As examples, either or both of client devices 102A and 102B may take the form of smartphones, tablet computers, laptop computers, desktop computers, purpose-built computerized assistant devices (e.g., computerized assistant device 102 of FIG. 1), wearable devices, augmented/virtual reality devices, media streaming devices, etc. In some implementations, client devices 102A and/or 102B, as well as server 206, utterance annotation computing device 202, data store 208, and/or other computing devices described herein, may be implemented as computing system 1500 described below with respect to FIG. 15. Furthermore, the devices and arrangements shown in FIG. 2 are non-limiting examples, and a computerized assistant may be implemented on any suitable device or combination of suitable devices. For example, client devices 102A and 102B may be two client devices of any suitable number of client devices (e.g., 10s, 100s, 1000s, or more). Similarly, utterance annotation computing device 202 may be one of a plurality of any suitable number of utterance annotation computing devices.

Client devices 102A and 102B each run a computerized assistant application 104A/104B. As used herein, a "computerized assistant application" includes any suitable combination of software, hardware, and/or firmware components usable to perform any or all of the functions of a computerized assistant, including detecting and responding to client utterances. For example, a computerized assistant application may take the form of a user-installable software application, a component of a device operating system, a web application accessed via an Internet browser, an Application Specific Integrated Circuit (ASIC), etc. Furthermore, a computerized assistant application may run entirely locally, and/or may communicate/cooperate with one or more remote devices or services and/or other aspects of the computerized assistant application.

This scenario is illustrated in FIG. 2, in which client devices 102A and 102B communicate with a server 206 via a network 200. Network 200 may take the form of any suitable computer network including, for example, the Internet. Depending on the implementation, server 206 may perform any number of complementary functions to facilitate operation of a computerized assistant. In a typical example, the computerized assistant applications running on the client devices may be configured to detect client utterances and transmit some representation of the detected client utterances to server 206. Server 206 may then interpret the client utterances, retrieve any applicable information, and generate a computerized assistant response that is transmitted to the client devices for delivery to a human user. In other examples, however, another suitable distribution of labor may be used. For instance, the computerized assistant applications may be configured to operate substantially locally, while server 206 distributes updates to the client devices as the computerized assistant software is modified.

In any case, in the illustrated example, initial training of the computerized assistant at least partially occurs at server 206. As discussed above, annotated client utterances may be used to develop and refine a model via supervised machine learning that allows the computerized assistant to respond to novel client utterances. An utterance annotation computing device 202 is configured to present an utterance annotation interface 204 by which a human annotator may annotate client utterances. The annotated utterances may then be output to data store 208, at which point they may be used to train the computerized assistant.

In some examples, one or more of the devices shown in FIG. 2 (e.g., any combination of client devices 102A and/or 102B, network 200, utterance annotation computing device 202, server 206, and/or data store 208) may cooperate to provide a computerized assistant training pipeline 300 for training a computerized assistant. As will be described below, pipeline 300 may include one or more computational machines. Accordingly, each machine of pipeline 300 may be implemented by any suitable combination of one or more devices from FIG. 2.

Figure 3:
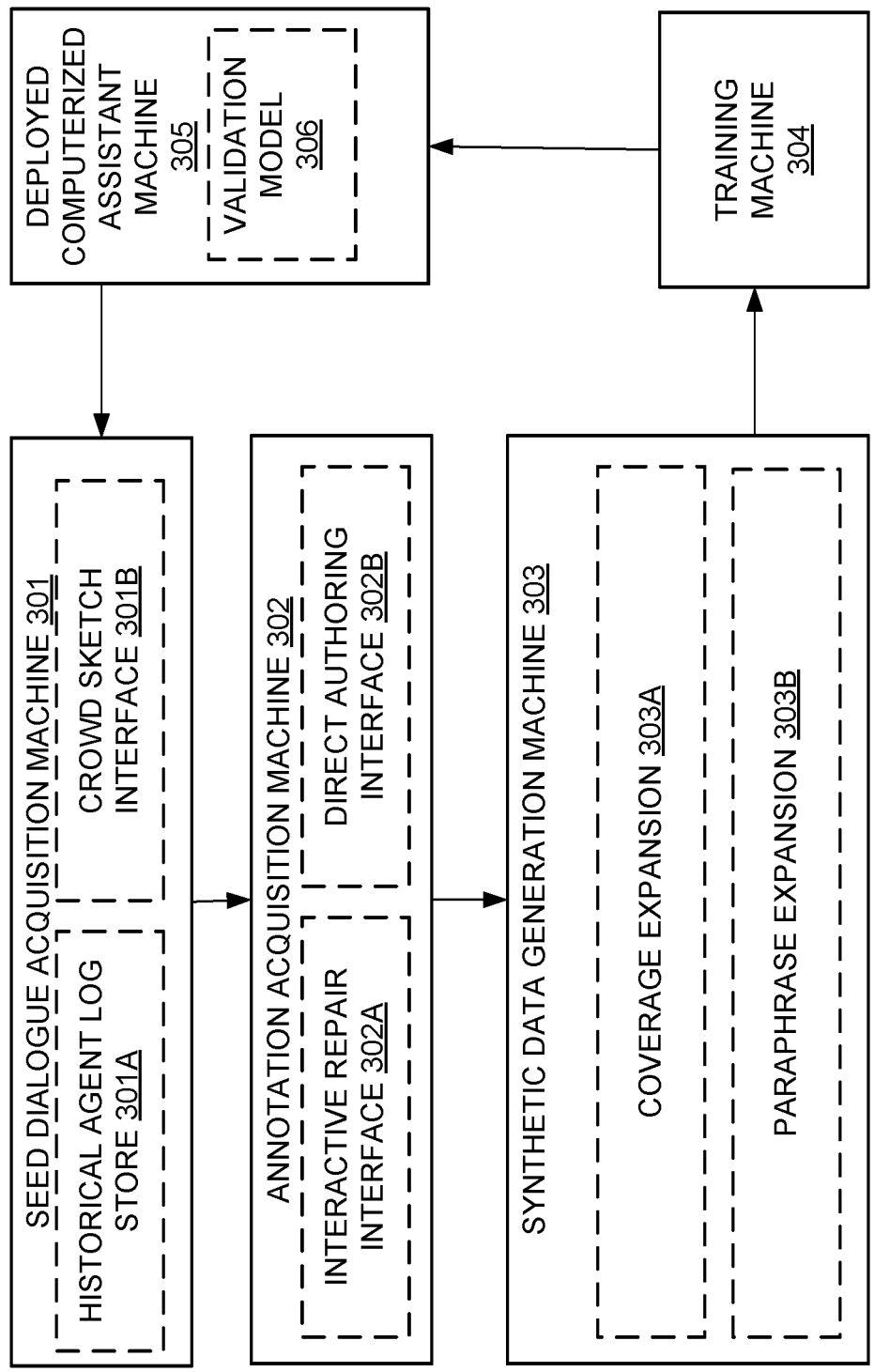
FIG. 3 schematically illustrates a training pipeline for a computerized assistant.

Pipeline 300 is shown in more detail in FIG. 3. Pipeline 300 is configured for the improvement of a computerized assistant via training, while the system may meanwhile be deployed for live use by one or more clients.

Pipeline 300 includes a deployed computerized assistant machine 305. Deployed computerized assistant machine 305 is configured to provide computerized assistant functionality, e.g., based on a machine learning model learned from training data. Computerized assistant machine 305 may include any suitable machine learning technologies and/or natural language processing technologies, as will be described further with regard to FIG. 15. Computerized assistant machine 305 is configured to carry out dialogues with one or more users (e.g., as shown in FIG. 1), in order to provide automated assistance to the users. Optionally, in some examples, computerized assistant machine 305 includes a validation model 306 configured for testing candidate training updates and/or reconfiguration to the computerized assistant machine 305. For example, validation model 306 may be configured for operating computerized assistant machine 305 based on new training or configuration that has not yet been tested. Accordingly, computerized assistant machine 305 may make low-quality and/or low-confidence decisions during initial usage of a validation model 306. However, validation model 306 is further configured to track low-quality and/or low-confidence decisions by computerized assistant machine 305, so as to potentially correct such decisions by making different decisions during live operation, and/or to re-train the computerized assistant to avoid similar mistakes in the future.

Deployed computerized assistant machine 305 is trained via machine learning training techniques at training machine 304. Training machine 304 may use any suitable machine learning training techniques, as described further with regard to FIG. 15. Deployed computerized assistant machine 305 may be trained using labelled data consisting of seed dialogues and annotations. As described above, training machine 304 may require large amounts of exemplary labelled data for effective training of deployed computerized assistant machine 305.

Accordingly, pipeline 300 includes a seed dialogue acquisition machine 301 configured to acquire exemplary labelled data for training. Seed dialogue acquisition machine 301 may include a historical agent log store 301A, configured for accessing historical examples of interaction between a client and deployed computerized assistant machine 305. In addition to such historical data, seed dialogue acquisition machine 301 is configured to receive crowd sketch data at a crowd sketch interface 301B. Crowd sketch data includes interaction between the deployed computerized assistant machine 305 and crowd workers (e.g., exemplary client users, or annotator workers with experience annotating dialogue examples). For example, crowd sketches may include dialogues conducted between the computerized assistant machine 305 and a human annotator based on a validation model 306, so as to validate the quality and/or confidence of the validation model 306. Crowd sketch interface 301B may be configured for any suitable interaction and data-gathering based on such interaction, e.g., free-form conversations and gathering indicators of client satisfaction during the interaction for use as reinforcement signals in reinforcement learning. Seed dialogues may be represented in a computer-readable form including an ordered sequence of one or more utterances by the computerized assistant and/or client(s), and/or primitive actions by the computerized assistant (e.g., application-programming interface (API) calls to look up information, cause a real-world result, etc.).

Pipeline 300 further includes an annotation acquisition machine 302 configured to acquire annotations for the exemplary seed dialogues acquired at seed dialogue acquisition machine 301 (e.g., in the form of historical data at 301A and/or crowd sketches at 301B). Annotation acquisition machine 302 is configured to present one or more user interfaces for human annotators (e.g., clients and/or volunteer or professional workers with any suitable amount of experience/training) to provide annotations for labelling exemplary seed dialogues. Annotations for exemplary seed dialogues may take any suitable form. For example, as will be described with regard to FIG. 6 and throughout the present disclosure, annotations for seed dialogues may take the form of a computer-readable command in a predefined command language.

Computer-readable labels (e.g., computer-readable commands or any other suitable labels) may represent semantic contents of a dialogue in a form that can be used by a deployed computerized assistant machine 305 for training and/or future decision-making. In a direct authoring interface 302B, a worker is presented with a seed dialogue and asked to hand-write an annotation command describing the semantics of the seed dialogue, e.g., using a library of domain-specific combinator functions. In an interactive repair interface 302A, a worker is presented with a seed dialogue and a selection of candidate annotations for the seed dialogue and is tasked with selecting a best annotation or indicating that none of the annotations are appropriate, thereby associating the most appropriate annotation (if any) with the seed dialogue. If there is no appropriate annotation, interactive repair interface 302A may be configured to present a direct authoring interface 302B as a fallback. Exemplary user interfaces for performing interactive repair and/or direct authoring are described further with regards to FIGS. 10-14.

Seed dialogue acquisition machine 301 and annotation acquisition machine 302 may obtain a plurality of different annotated seed dialogues, suitable for training at training machine 304. However, even if numerous examples are collected (e.g., from numerous client interactions with the system, and numerous human annotators interacting via crowd sketches, interactive repair, and direct authoring), even more data may be desired for training (e.g., the collected examples may be insufficient to obtain a deployed computerized assistant machine 305 that is able to handle diverse interactions not seen in the training data). Accordingly, pipeline 300 further includes a synthetic data generation machine 303 configured to automatically expand the training data to cover more different semantic situations and/or utterance phrasings. Synthetic data generation machine 303 optionally includes a coverage expansion machine 303A configured to expand an annotation command to cover other semantic situations by re-parametrizing the annotation command, and to generate a corresponding alternative dialogue to be paired with the annotation command to make a new annotated dialogue for training. Synthetic data generation machine 303 optionally further includes a paraphrase expansion machine 303B configured to generate alternative paraphrased dialogues to produce annotated dialogues that cover other wordings/phrasings than seen in the original annotated data acquired by machines 301 and 302. In some examples, coverage expansion machine 303A and/or paraphrase expansion machine 303B are configured to acquire new parameters/paraphrases from human annotators, e.g., as described with regard to FIGS. 8-9. In some examples, coverage expansion machine 303A and/or paraphrase expansion machine 303B may be configured to acquire new parameters/paraphrases by operating one or more computer models (e.g., natural language models). For example, coverage expansion machine 303A may be configured to output new semantic parameters based on a dictionary or type-system representation of different semantic categories of data, and/or based on a machine learning model configured to learn a latent space of different semantic situations. Similarly, paraphrase expansion machine 303B may be configured to use a thesaurus and/or a natural language model to generate new paraphrases for portions of seed dialogues. Suitable computer models are described further with regard to FIG. 15.

Synthetic data generation machine 303 may output a large plurality of training data (e.g., a substantially larger number of annotated dialogues than were acquired at seed dialogue acquisition machine 301 and annotation acquisition machine 302). Accordingly, this training data may be used for training at training machine 304, thereby continually updating deployed computerized assistant machine 305 to handle new situations exemplified in the generated training data. In some examples, the synthetic data may be of unknown quality (e.g., paraphrases generated from a thesaurus, natural language model, and/or from human annotators may be of unknown accuracy relative to original phrases). Accordingly, by updating validation model 306 and operating deployed computerized assistant machine 305 according to the validation model 306, the computerized assistant may be used for live interaction in new situations covered by the generated training data. Pipeline 300 is configured to continually improve functionality of the computerized assistant based on the new situations in live interaction, by generating historical agent data and/or crowd sketches based on these new situations, and acquiring annotations for these new situations for further data generation and/or training. By expanding the model to handle a large number of previously-unseen situations from generated data, the computerized assistant may be useable for interaction in a wide variety of situations.

FIG. 4 shows an exemplary method 400 for generating training data for training a computerized personal assistant, e.g., in a pipeline 300. At 402, method 400 includes loading, into a computer memory, a computer-readable transcript representing an ordered sequence of one or more dialogue events. Dialogue events may include any suitable events between a client and a computerized assistant, e.g., a client utterance or a computerized assistant response. Computerized assistant responses may include outputting an utterance, and/or primitive commands to invoke APIs, look up data, and/or actuate effects in the real world.

At 404, method 400 includes acquiring a computer-readable command parametrized by a seed semantic parameter and describing an exemplary ordered subsequence of one or more dialogue events from the computer-readable transcript. Acquiring a computer-readable command for the computer-readable transcript may be performed in any suitable manner, e.g., using direct authoring or interactive repair in an annotation acquisition machine 302 (described further below with regard to FIGS. 10-14).

At 406, method 400 includes acquiring an alternative semantic parameter differing from the seed semantic parameter, and re-parametrizing the computer-readable command by replacing the seed semantic parameter with the alternative semantic parameter. The alternative semantic parameter for replacing the seed semantic parameter may be acquired in any suitable fashion, for example, using a user interface for supplying alternative semantic parameters as described below with regard to FIG. 8.

At 408, method 400 further includes generating an alternative ordered subsequence of one or more dialogue events based on the computer-readable command and the alternative semantic parameter, the alternative ordered subsequence of one or more dialogue events differing from the exemplary ordered subsequence of one or more dialogue events. Generating the alternative ordered subsequence is based on executing semantic contents of the computer-readable command, e.g., sub-commands to detect user utterances, output computer assistant utterances, and/or perform primitive actions, as will be described further below with regard to FIG. 7.

At 410, method 400 further includes outputting, to a data store, an alternative computer-readable transcript including the alternative ordered subsequence of one or more dialogue events, the alternative computer-readable transcript having a predetermined format usable to train the computerized assistant. For example, the alternative computer-readable transcript may represent the ordered sequence of user utterances to be detected, and computer utterances and/or actions in response to the user utterances, in the same format as historical agent logs collected during system operation, which in turn may be useable for training.

FIG. 5 shows an alternative method 500 for generating and storing training data based on a seed command, where instead of generating an exemplary sequence, one or more sub-commands are saved. The saved sub-commands can be used to generate and output data during future generation of synthetic annotated dialogues. For example, while generating a dialogue for the command according to method 400, if the command includes a sub-command, the sub-command may be replaced with a saved alternative sub-command that was generated according to method 500.

Figure 6:
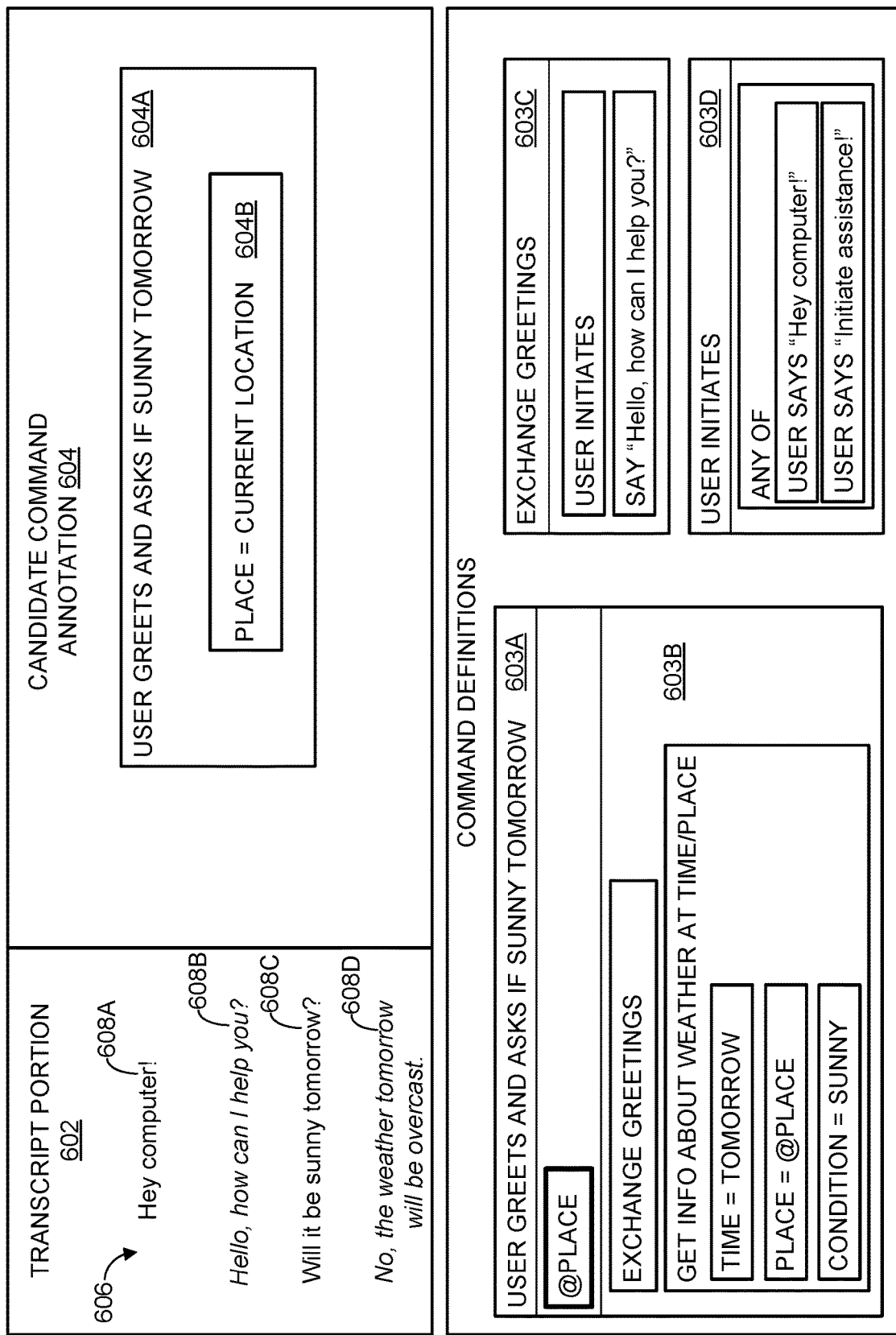
FIG. 6 illustrates an exemplary computer-readable interpretation of an interaction between a client and a computerized assistant, including an annotation in the form of a computer-readable command.

At 502, method 500 includes loading, into a computer memory, a computer-readable seed command describing an ordered sequence of two or more top-level dialogue events. As indicated at 504, a dialogue event includes a client utterance or a computerized assistant response. As indicated at 506, the seed command includes one or more sub-commands. Each sub-command of a seed command may correspond to a portion of the ordered sequence of two or more top-level dialogue events. As indicated at 508, a focal sub-command of the one or more sub-commands is parametrized by a seed semantic parameter. For example, FIG. 6 shows an example of a transcript portion 602 including user utterances 608A and 608C, and computer utterances 608B and 608D. FIG. 6 also shows a candidate command annotation 604 for the transcript portion 602, in which the transcript portion 602 is annotated with a command 604A describing an interaction in which a user greets the computer and asks if it will be sunny tomorrow. The command 604A is a domain-specific, internal representation of the dialogue with a semantic parameter 604B indicating a location of interest for the query. As shown in the command definitions section, the command for the user to greet the system and ask if it will be sunny may be defined as a named command 603A in terms of one or more sub-level commands 603B. For example, named command 603A is defined in terms of a sequence of commands to exchange greetings, and to get info about the weather at a time/place, with the "get info about the weather" command specially parametrized to ask about whether it will be sunny tomorrow. Accordingly, transcript portion 602A may be represented by the top-level command 604A and/or by a more complex listing of sub-commands as shown in the expanded definition at 603A and 603B. In turn, the "exchange greetings" command 603C may be defined in terms of sub-commands and/or primitive actions (e.g., a "SAY" action). Similarly, "user initiates" command 603D may be defined in terms of various possible user utterances to be detected. Although not shown in FIG. 6, the "get info about weather at time/place" command may similarly be defined in terms of one or more sub-level commands, e.g., in terms of a primitive command to look up information from a weather service API and a "SAY" action to output the information.

Returning to FIG. 5, at 510, method 500 further includes re-parametrizing the focal sub-command by outputting a plurality of different re-parametrized focal sub-commands wherein, in each re-parametrized focal sub-command, the seed semantic parameter is replaced by one of a plurality of different synthetic semantic parameters.

Figure 7:
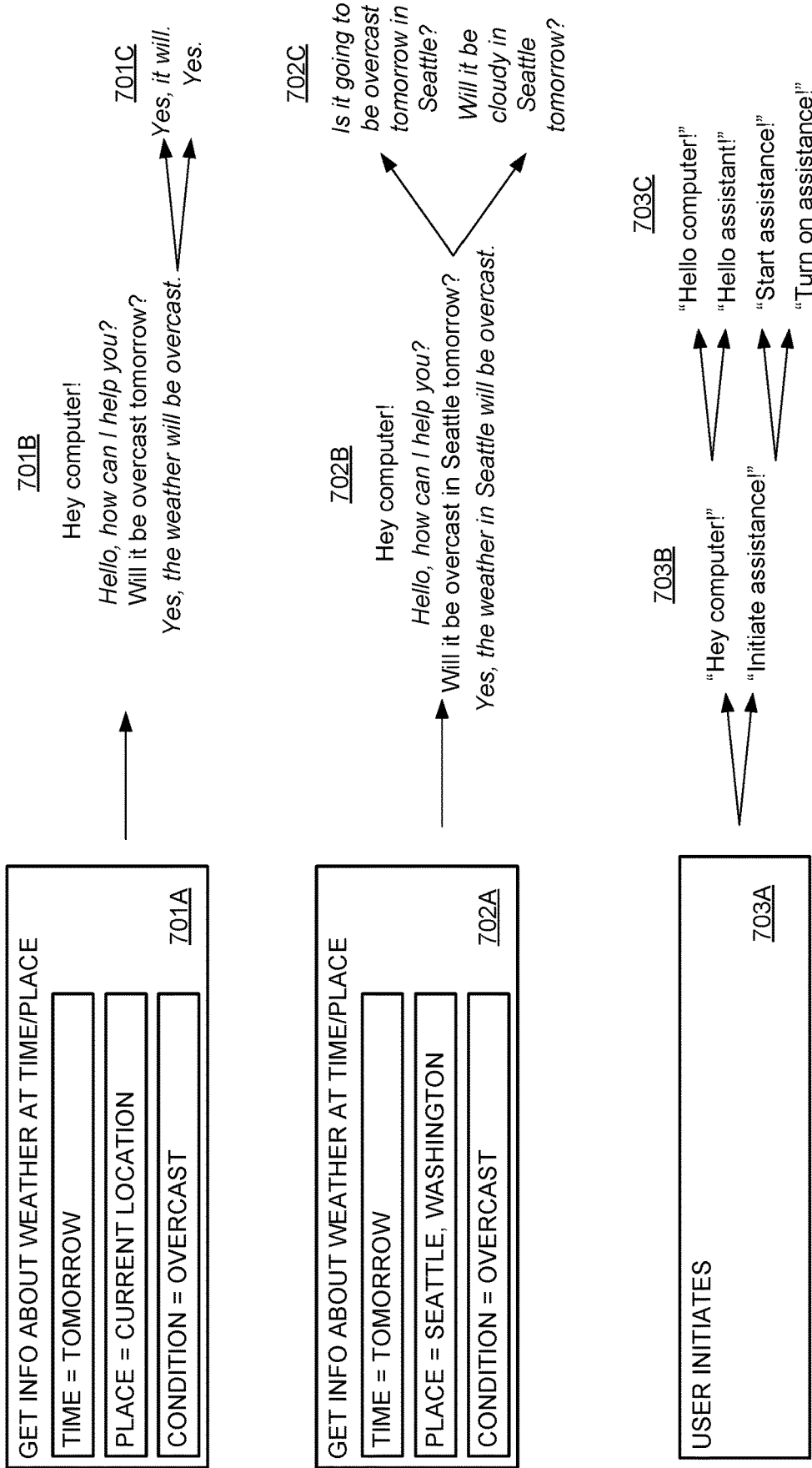

FIG. 7 shows a generated replacement focal sub-command 701A based on the seed dialogue and command shown in FIG. 6. For example, focal sub-command 701A could be used as a replacement for the corresponding focal sub-command to "get info about the weather" shown in the definition of the "user greets and asks if sunny" command shown in FIG. 6. The command 701A is re-parametrized by replacing the "sunny" condition parameter with "overcast," and another generated command 702A in which the "current location" place parameter is replaced with a "Seattle" place parameter. Accordingly, these generated commands 701A and 702A describe dialogues that are similar to the dialogue shown in FIG. 6, but with slightly different semantic contents.

Returning to FIG. 5, as indicated at 512, in some examples, the focal sub-command includes a further layer of sub-commands (e.g., a hierarchy of sub-commands). For example, as shown in FIG. 6, the "user greets and asks if sunny tomorrow" command is defined in terms of sub-commands to exchange greetings, and get info about the weather, which in turn may be defined in terms of further sub-commands. Accordingly, re-parametrizing the focal sub-command may include re-parametrizing further sub-commands (e.g., recursively re-parametrizing sub-commands at different levels throughout the hierarchical structure of the focal sub-command). In some examples, the focal sub-command is one of a plurality of sub-commands selected for re-parametrization, at the same or different levels of the hierarchical structure. For example, the further layer of sub-commands may include further recursive layers of sub-commands, and accordingly, re-parametrizing the further layer of sub-commands includes recursively re-parametrizing each recursive layer of sub-commands.

At 514, method 500 further includes, for each of the plurality of different synthetic semantic parameters: saving a corresponding re-parametrized focal sub-command. For example, as shown in FIG. 7, sub-commands 701A and 702A may be saved. Although not shown in FIG. 7, numerous other re-parametrized focal sub-commands may be generated (e.g., by varying the time, place, and condition semantic parameters). By combining diverse domain-specific functions (e.g., similar to the "get info about weather" command) and varying parameters, tens, hundreds, thousands, or even more commands and corresponding dialogue sequences may be generated for a command. For example, when one of the sub-commands is a primitive command to access an application programming interface (API), the seed semantic parameter may be an API-specific parameter for accessing the API, and re-parametrizing the primitive command may include storing a different API-specific parameter for accessing the API. Similarly, when one of the sub-commands is a primitive command to output a computer assistant utterance, the seed semantic parameter may be a computer-readable description of a natural language feature of the computer assistant utterance, and re-parametrizing the primitive command may include storing a computer-readable description of a different natural language feature. Similarly, when one of the sub-commands is a primitive command to recognize content of one or more client utterances and is configured to generate a result dialogue event including a computer-readable description of recognized content of the one or more client utterances, the seed semantic parameter may be a computer-readable description of a natural language feature of the client utterance, and re-parametrizing the primitive command includes storing a computer-readable description of a different natural language feature. For example, although not shown in FIG. 6, the "exchange greetings" command could be parametrized by a semantic parameter indicating one or more utterances a computer assistant is configured to recognize as a greeting by a user, e.g., a specific name by which to call a computer assistant, a greeting in a specific language, etc.

In some examples, a focal sub-command is configured to generate up to one result dialogue event, and a second one of the sub-commands is configured to be conditionally executed, responsive to the focal sub-command returning a result dialogue event, the method further including re-parametrizing the second sub-command. For example, as shown in FIG. 6, the "user greets and asks if sunny tomorrow" command defined at 603A includes sub-commands 603B to exchange greetings and get info about the weather; the "get info about the weather" command may be configured to be executed conditionally based on the "exchange greetings" command describing a dialogue in which the user greeted the computer assistant, but not executed if the user did not initiate a dialogue. Although not shown in FIG. 6, in addition to detecting a specific user utterance such as a greeting, conditional execution may be contingent on getting specific data from the user (e.g., getting a specific date or place for a weather query, for example.).

Returning briefly to FIG. 4, as compared to method 500, instead of or in addition to saving the generated focal sub-command, after re-parametrization, method 400 includes generating an alternative ordered subsequence of dialogue events based on a command at 408, and outputting a corresponding transcript to a data store at 410. Similarly, method 500 may optionally further include using one of the re-parametrized focal sub-commands to generate an ordered sequence of one or more dialogue events. Accordingly, FIG. 7 shows some examples of outputting alternative ordered subsequences based on re-parametrized commands 701A and 702A. For example, at 701B, FIG. 7 shows an alternative ordered subsequence of dialogue events for "get info about weather at time/place" as re-parametrized at 701A. Similarly, at 702B, FIG. 7 shows an alternative ordered subsequence for the re-parametrized command 702A. In some examples, different alternative ordered subsequences may be generated for a command even if it has no semantic parameters for re-parametrization, e.g., the "user initiates" command 703A describes the detection of either of two different utterances by the user, and can generate a subsequence including either such utterance, as shown at 703B. Alternately or additionally to saving generated commands and/or ordered sequences of dialogues, the methods of the present disclosure may further include maintaining a grammar model configured to efficiently generate a recursive expansion of a command by re-parametrizing one or more semantic parameters at each recursive layer of sub-commands for the command.

In some examples, re-parametrizing the command includes operating a computer model linking a computer-readable description of the seed semantic parameter to one or more candidate alternative semantic parameters, in order to select a replacement parameter for the command (or for a focal sub-command, multiple sub-commands, etc.). For example, the computer model may include a natural language model, a neural network, a dictionary/thesaurus, and/or a type system configured to categorize semantic features in different categories (e.g., times, places) or based on relationships (e.g., synonyms, antonyms, etc.).

Figure 8:
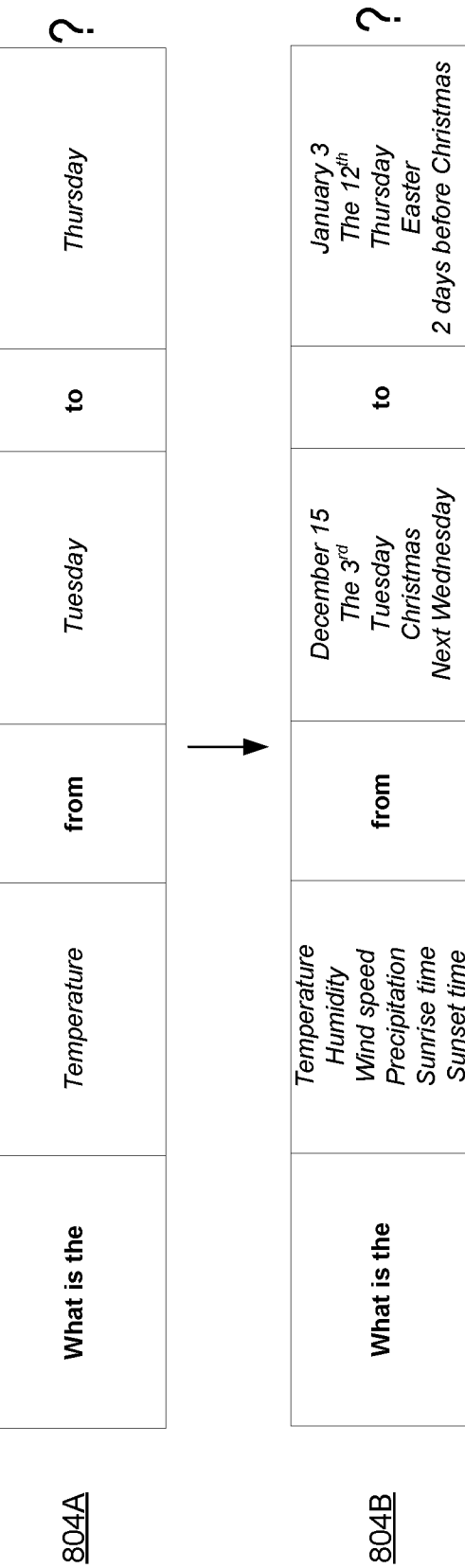

Alternately or additionally, different synthetic semantic parameters may be acquired via a user interface for acquiring synthetic semantic parameters from human annotators. The user interface is configured to graphically display a portion of the computer-readable transcript corresponding to the seed semantic parameter; and receive one or more computer inputs indicating the alternative semantic parameter. For example, FIG. 8 shows a non-limiting example of an interface in which a worker is presented with an initial representation 804A of a command shown as a sequence of dialogue events, some of the dialogue events corresponding to semantic parameters of the command (shown in italic) and others being fixed (in bold). The user interface may provide instructions to the human annotator to fill in one or more alternative parameters for each semantic parameter as shown at 804B. For example, the human annotator may be asked to select alternative semantic parameters from a list, enter alternative semantic parameters directly, and/or validate alternative semantic parameters chosen by another worker or by a computer model.

In some examples, as alternative semantic parameters are acquired for a given seed semantic parameter, they may be stored in a data store with an address defined by the seed semantic parameter. Accordingly, acquiring a semantic parameter may be based on looking up one or more candidate synthetic semantic parameters in the semantic parameter data store by locating an address defined by the seed semantic parameter, thereby avoiding replicated effort to acquire new alternative semantic parameters.

In some examples, generating the ordered sequence of one or more dialogue events includes: outputting an initial ordered sequence of one or more dialogue events based on the re-parametrized focal sub-command; and paraphrasing the initial ordered sequence to generate the ordered sequence. For example, as shown in FIG. 7, a portion of the end of dialogue ordered sequence 701B, "Yes, the weather will be overcast," may be paraphrased to a simpler phrase at 701C such as "yes, it will" or "yes" (e.g., since the user likely already has context for what question is being affirmatively answered based on the previous portions of dialogue). In addition to paraphrasing the system utterances, the user utterances may be paraphrased as shown at 702B and 702C. Similarly, the different "user initiates" utterances shown at 703B may be paraphrased as at 703C. In some examples, paraphrasing the initial ordered subsequence includes, for a portion of the initial ordered subsequence, operating a computer model to select a candidate paraphrase of the portion. For example, the computer model may include a natural language model, a neural network, a dictionary/thesaurus, and/or a type system configured to categorize natural language utterances in different categories (e.g., times, places) or based on relationships (e.g., synonyms, antonyms, etc.).

Alternately or additionally, in some examples, paraphrasing the initial ordered subsequence includes: graphically displaying a portion of the initial ordered subsequence; and receiving one or more computer inputs defining a candidate paraphrase of the portion. For example, FIG. 9 shows a non-limiting example of a computer interface for acquiring paraphrases from human annotators. The interface includes a transcript area 910 showing a transcript portion 905A to be paraphrased, including a focal portion 911. The interface further includes a paraphrase input area 912 in which a user is asked to fill out three different paraphrases of the focal portion 911, namely paraphrases 913A, 913B, and 913C. The worker may be instructed to supply one, several, or any suitable number of paraphrases for portion 911 and/or any other portions of the transcript or other transcripts. The worker may be provided with instructions describing how to supply quality paraphrases, e.g., instructions indicating that the paraphrases should be accurate, instructions indicating that the paraphrases should be expressed in certain way (e.g., avoiding certain words, including certain words, using formal language, using casual language, etc.). In some examples, the worker may be asked to submit paraphrases directly (e.g., by inputting text or uttering speech into a microphone). In other examples, the worker may be asked to choose a best paraphrase (e.g., to validate human-generated paraphrases and/or computer-generated paraphrases).

After acquiring a paraphrase for a transcript portion (e.g., from a human annotator or a computer model), the methods of the present disclosure may further include outputting, to a paraphrase data store, a computer-readable representation of the candidate paraphrase for a portion of the initial ordered subsequence, wherein the stored representation is addressable based on the portion of the initial ordered subsequence. Accordingly, paraphrasing the initial ordered subsequence may include, for a portion of the initial ordered subsequence, looking up one or more candidate paraphrases in the paraphrase data store by locating an address defined by the portion, to retrieve previously-acquired paraphrases (e.g., in lieu of gathering new data from human annotators).

As described above with regard to FIG. 3, acquiring a computer-readable command annotation for a seed dialogue example may include direct authoring and/or interactive repair. Accordingly, acquiring the computer-readable command for a seed dialogue represented by a computer-readable transcript includes: graphically displaying the computer-readable transcript; and receiving one or more computer inputs selecting a computer-readable command to use for annotating the transcript. In some examples, acquiring the computer-readable command includes graphically displaying a hierarchical menu including a plurality of candidate commands, wherein the one or more computer inputs selecting the computer-readable command indicate one of the candidate commands. The acquisition of command annotations for dialogues is described further with regard to FIGS. 10-14.

As discussed above, use of an utterance annotation interface presented by an utterance annotation computing device may facilitate intuitive and user-friendly annotation of client utterances. FIG. 10 illustrates an example method 1000 for an utterance annotation computing device. As with other computing devices described herein, the utterance annotation computing device used to implement method 1000 may have any suitable hardware configuration and form factor and may in some cases be implemented as computing system 1500 described below with respect to FIG. 15. In general, such a computing device will include a display engine configured to present a graphical user interface such as an utterance annotation interface via a display device, as well as an utterance annotation machine, which may perform various processing operations and be implemented as one or more logic machines and storage machines as will be described below with respect to FIG. 15.

Figure 11A:
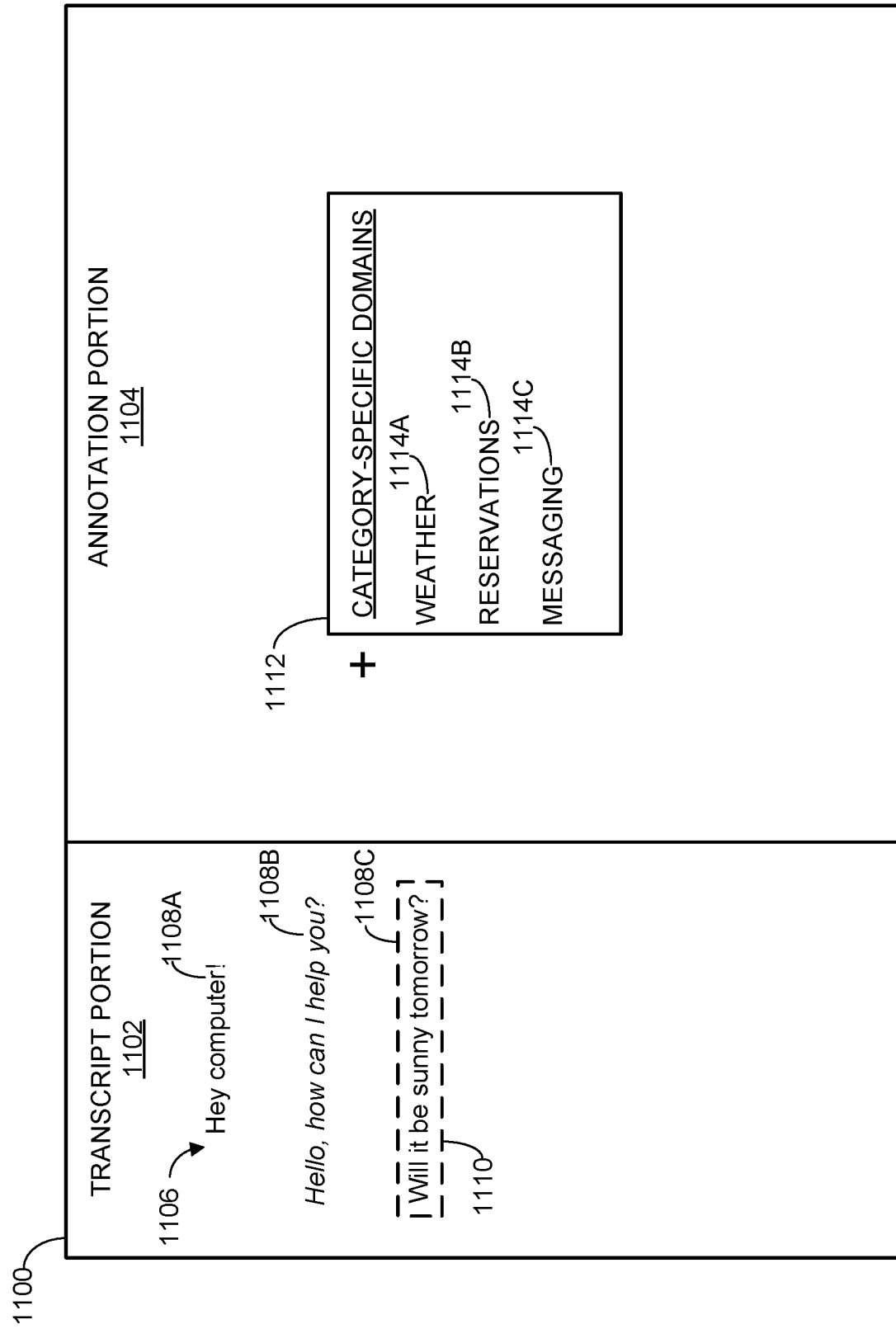
FIGS. 11A-11E illustrate annotation of an example client utterance via an example utterance annotation interface.

At 1002, method 1000 includes graphically displaying an unannotated transcript representing an ordered sequence of one or more dialogue events involving a client and a computerized assistant, with at least one of the dialogue events taking the form of an example client utterance. This is shown in FIG. 11A, which depicts an example utterance annotation interface 1100. It will be understood that interface 1100, as well as the unannotated transcript, dialogue events, utterance annotations, etc., described herein are non-limiting examples.

As shown, interface 1100 includes a transcript portion 1102 and an annotation portion 1104. The transcript portion includes an unannotated transcript 1106 including several dialogue events 1108A-C represented as text, one of which is an example client utterance 1110. Dialogue events include any or all natural language interactions between a client and a computerized assistant, such as client utterances and computerized assistant responses. Furthermore, as discussed above, a client utterance may include any combination of human language words based on which a computerized assistant may be trained, and such utterances may be specified by a human or computer-generated. As used herein, an "example client utterance" is any client utterance displayed in the transcript portion that is annotated or will be annotated by a human annotator.

The unannotated transcript, as well as the included dialogue events, may originate from any suitable source. In one example, one or more dialogue events (e.g., client utterances) in the unannotated transcript may be written by the human annotator. Additionally, or alternatively, all or part of the unannotated transcript may be retrieved from a database of unannotated example client utterances. Such a database may be stored locally, retrieved from a remote source such as server 206 or data store 208 of FIG. 2, and/or obtained in other ways. Furthermore, the unannotated transcript may include any number of example client utterances, any or all of which may be annotated by a human annotator.

Returning briefly to FIG. 10, at 1004, method 1000 includes graphically displaying a hierarchical menu including a plurality of candidate utterance annotations. As used herein, "graphically displaying a hierarchical menu" includes displaying at least one data entry or node from a hierarchical menu. In other words, while the entire hierarchical menu may in some cases be displayed, in other cases any suitable portion or subdivision of the menu may be displayed.

As discussed above, in supervised machine learning, training data is often manually labeled by human annotators. This is often a specialized and technical task, requiring the human annotators to have advanced expertise and/or a background in computer programming. By contrast, the utterance annotation interface described herein simplifies the process of utterance annotation such that it can be performed by human annotators having relatively less experience, thus greatly broadening the pool of annotators that can be used to generate the training data. This is achieved by providing a hierarchical menu that includes a plurality of candidate utterance annotations. A "candidate utterance annotation" can be described as a human-readable label that, when selected, specifies a computer-readable label for an example client utterance. Annotating an example client utterance therefore becomes a matter of selecting, from a hierarchical menu, a set of human-readable utterance annotations, in much the same manner as filling out a computerized form. The set of selected utterance annotations define a computer-readable interpretation of the example client utterance, allowing for training of the computerized assistant.

An example workflow for using an utterance annotation interface is illustrated in FIGS. 11A-11E. Starting with FIG. 11A, utterance annotation interface 1100 includes an annotation portion 1104 which in turn includes a hierarchical menu 1112. The hierarchical menu includes a plurality of candidate utterance annotations, which in this case are filtered according to several category-specific domains 1114A-1114C. In other words, candidate utterance annotations having to do with weather queries may be exposed by selection of category-specific domain 1114A (WEATHER), while utterance annotations having to do with other types of utterances (e.g., those directed to making reservations or messaging) may be exposed by selecting different category-specific domains. The specific category-specific domains shown in FIGS. 4A-4D, as well as the category-specific subdomains and candidate utterance annotations described below, are provided as non-limiting examples. Furthermore, the hierarchical menu paradigm disclosed herein is also provided for the sake of example. In alternative implementations, the candidate utterance annotations may be presented in alternative lists or menus that may be searchable or filterable in other ways.

Figure 11B:
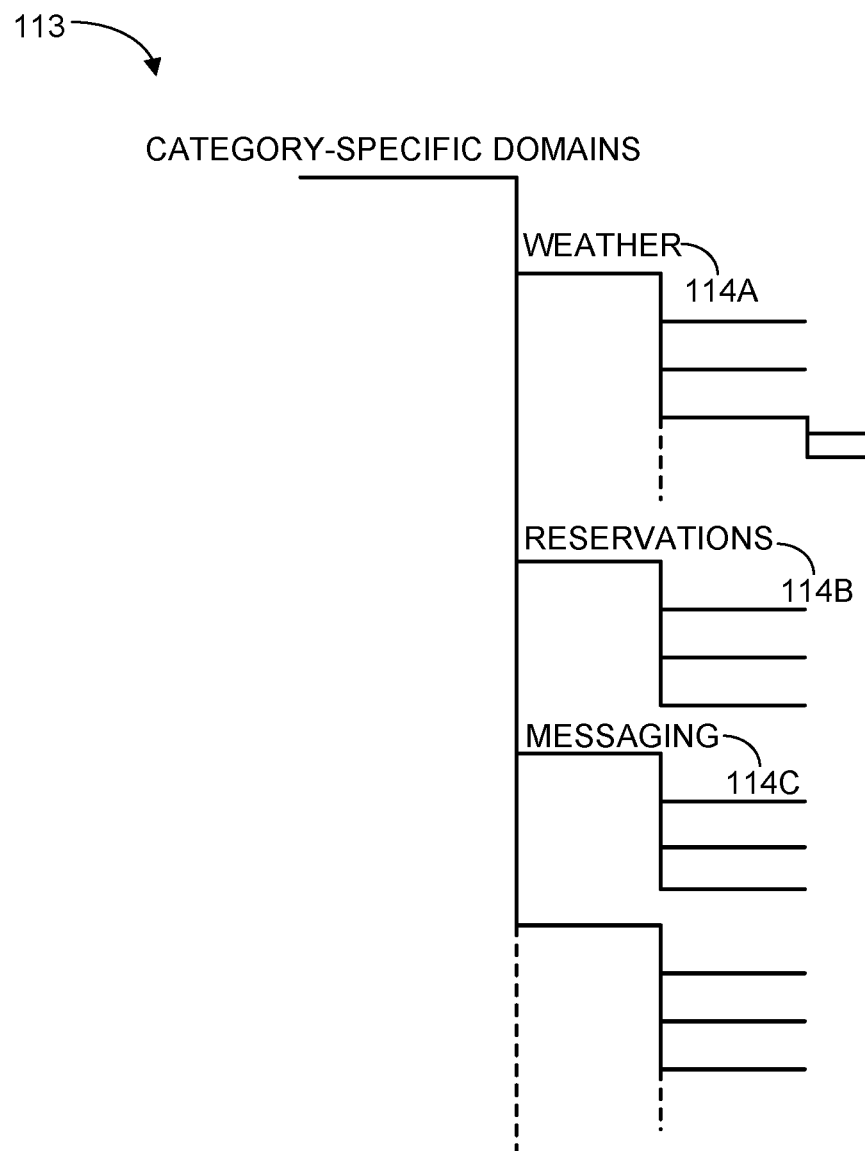

FIG. 11B depicts a tree structure 1113 representing hierarchical menu 1112 shown in FIG. 11A. Notably, FIG. 11B illustrates how data associated with hierarchical menu 1112 is organized by the utterance annotation computing device. In other words, while the hierarchical menu may be displayed in an utterance annotation interface in any suitable way (e.g., as is shown in FIGS. 11A and 11C-11E), FIG. 11B depicts one example data structure in which the underlying data (e.g., category-specific domains, subdomains, and utterance annotations) may be arranged.

As shown, data in the hierarchical menu is arranged in a hierarchical tree structure 1113. The highest level of the hierarchical menu illustrated in FIG. 11B includes several category-specific domains 1114A-1114C, although it will be understood that a hierarchical menu may include any suitable number of levels, including levels that are hierarchically-above or below those shown in FIG. 11B. As shown, each of the category-specific domains 1114A-1114C are associated with multiple sub-branches of the hierarchical tree structure that may, for instance, correspond to category-specific subdomains that are hierarchically nested under the category-specific domains. Each category-specific subdomain may in turn be associated with one or more utterance annotations (e.g., comprising "leaves" of the hierarchical tree structure), and/or additional hierarchically-nested category-specific subdomains, as illustrated by the numerous branches of hierarchical menu 1112 shown in FIG. 11B.

In some cases, the annotation utterance computing device may maintain relationships or links between various leaves or nodes in the hierarchical menu. For instance, while two utterance annotations may be represented as leaves on two different branches in the tree structure, the two utterance annotations may nonetheless be linked such that they may, in various instances, be graphically displayed with each other, recommended together, automatically applied together, etc. In one example scenario, after a human annotator selects a "current time" utterance annotation, a "current place" utterance annotation that is hierarchically nested under a different category-specific domain or subdomain may be automatically suggested based on a preexisting link between the "current time" and "current place" annotations.

Figure 11C:
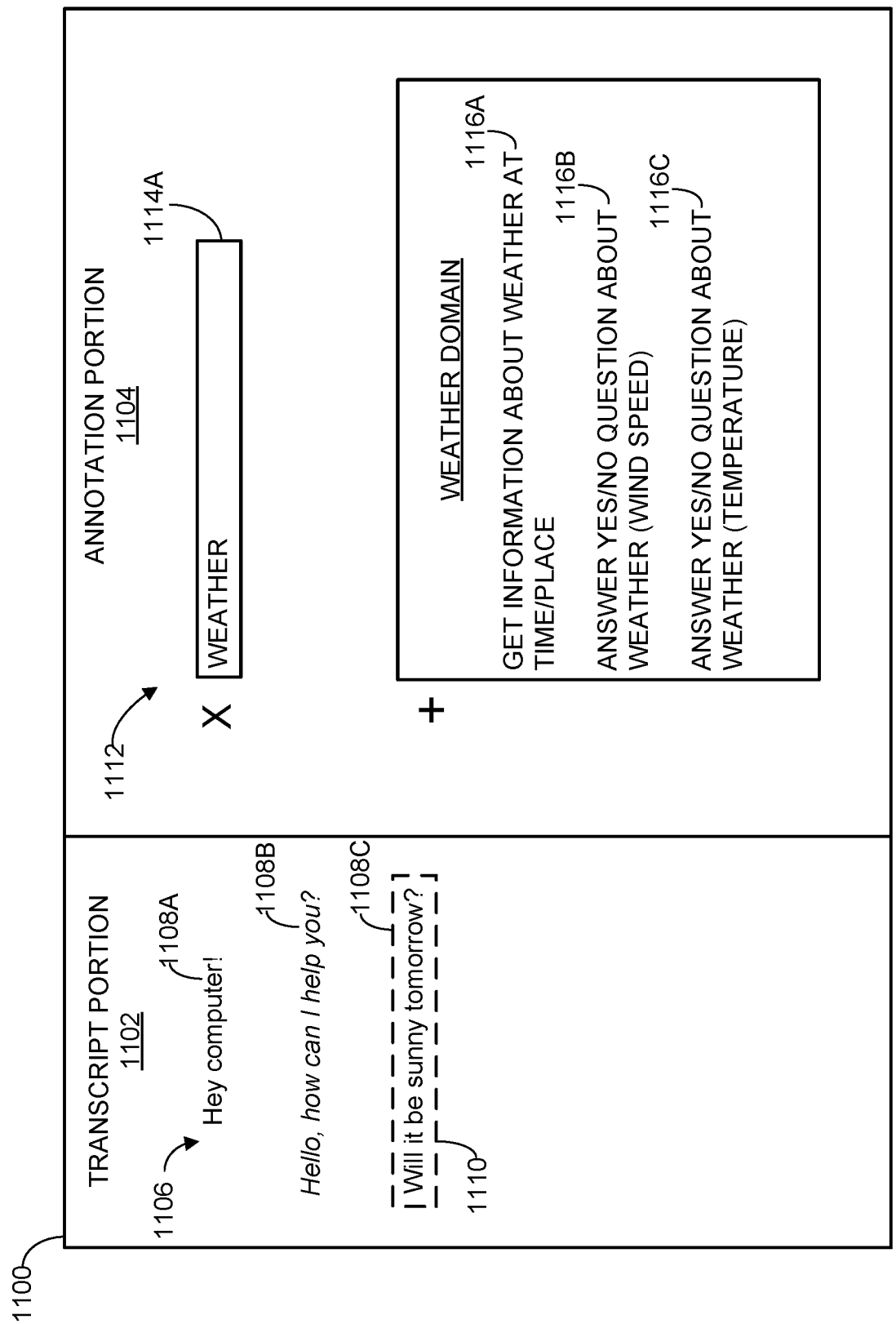

With reference now to FIG. 11C, as indicated above, category-specific domains may in some examples be hierarchically nested, such that each category-specific domain is associated with one or more category-specific subdomains. Specifically, in the illustrated example, the utterance annotation computing device has received a computer input to select the weather category-specific domain from the hierarchical menu, which has exposed various category-specific subdomains 1116A-1116C. As used herein, a "computer input" refers to any suitable input provided to a computer, and can include mouse clicks, button presses, touch screen inputs, speech-recognized verbal commands, etc. The category-specific subdomains in this example differentiate between different types of weather queries—specifically distinguishing whether the example client utterance is asking about weather information for a specific time and place, a yes/no question about wind speed, or a yes/no question about a temperature. Selection of any one of the category-specific subdomains may expose candidate utterance annotations related to the category-specific subdomain, and/or additional hierarchically nested category-specific sub domains.

Furthermore, in some examples, each of the category-specific domains and subdomains may themselves constitute candidate utterance annotations. In other words, each selection of a category-specific domain or subdomain may provide high-level information about the example client utterance that can be used by a computerized assistant to respond to similar utterances in the future. In the illustrated example, selection of the "weather" category-specific domain is recorded as an annotation and displayed in annotation portion 1104 in FIG. 11C. In other examples, however, the category-specific domains and subdomains may simply be categories used for filtering different types of candidate utterance annotations.

Figure 11D:
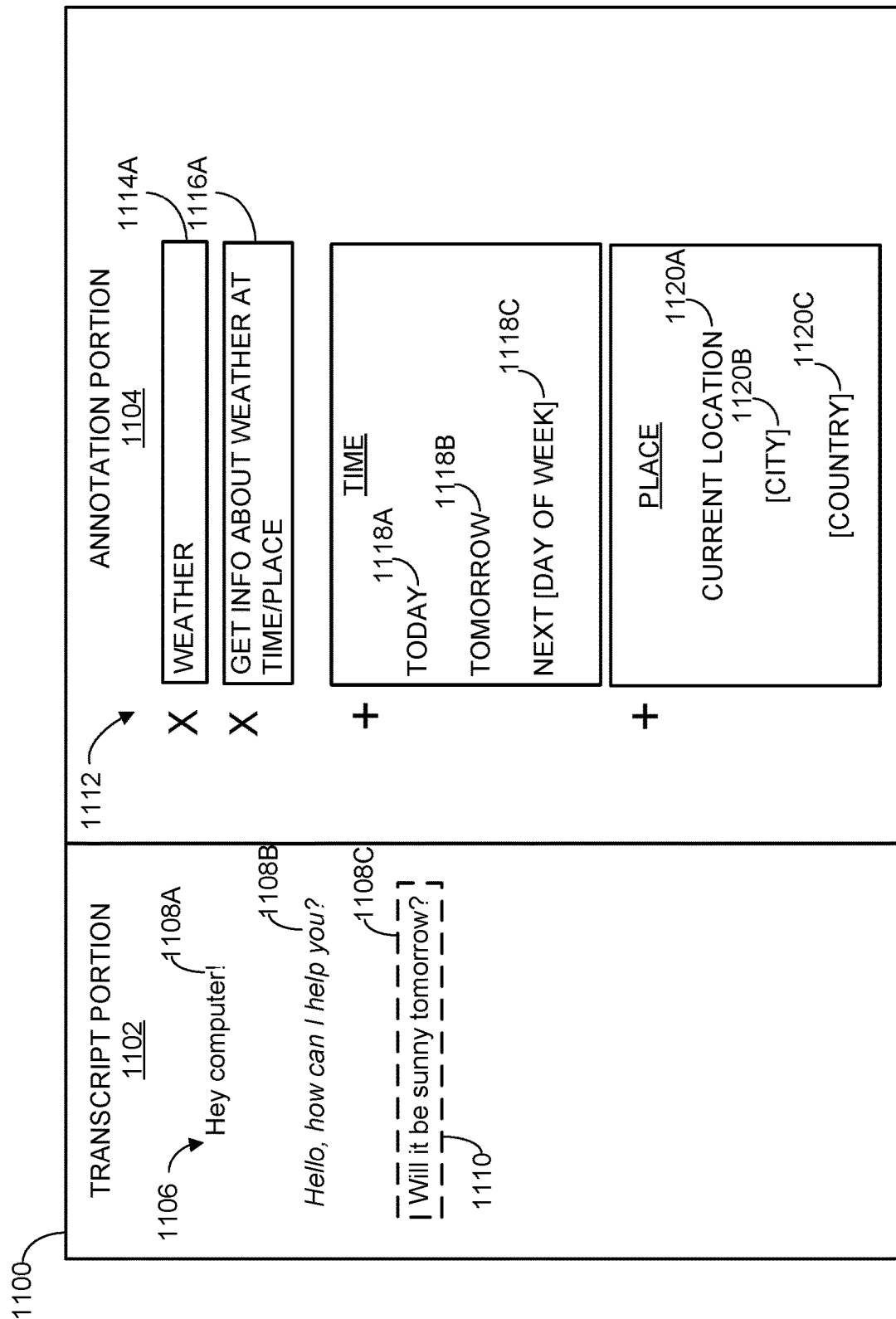

Turning now to FIG. 11D, the utterance annotation computing device has received a computer input selecting category-specific subdomain 1116A, indicating that the example client utterance is a request for weather information for a particular time and place. As such, annotation portion 1104 now displays several candidate utterance annotations 1118A-1118C relating to a "time" category-specific subdomain, as well as utterance annotations 1120A-1120C relating to a "place" category-specific subdomain. In other words, the computer input selecting category-specific subdomain 1116A has exposed a subset of candidate utterance annotations related to the category-specific subdomain.

Returning briefly to FIG. 10, at 1006, method 1000 includes receiving one or more computer inputs selecting, for each of one or more response parameters in the example client utterance, one or more utterance annotations from the hierarchical menu. As used herein, a "response parameter" in an example client utterance is any word or series of words within the client utterance that uniquely shape or define an appropriate computerized assistant response to the client utterance. In the example of FIGS. 4A-4D, the example client utterance is "Will it be sunny tomorrow?" For this client utterance, the word "sunny" is a response parameter that specifies a particular weather condition that the client is asking about, while the word "tomorrow" defines a time period that the client is asking about. The words "will it be" are a response parameter as they provide information regarding the type of response the client is requesting—namely, whether the condition "sunny" will be satisfied "tomorrow." It will be understood that an example client utterance may include any number and variety of response parameters, and that one or more words in an example client utterance need not belong to any response parameters.

Figure 11E:
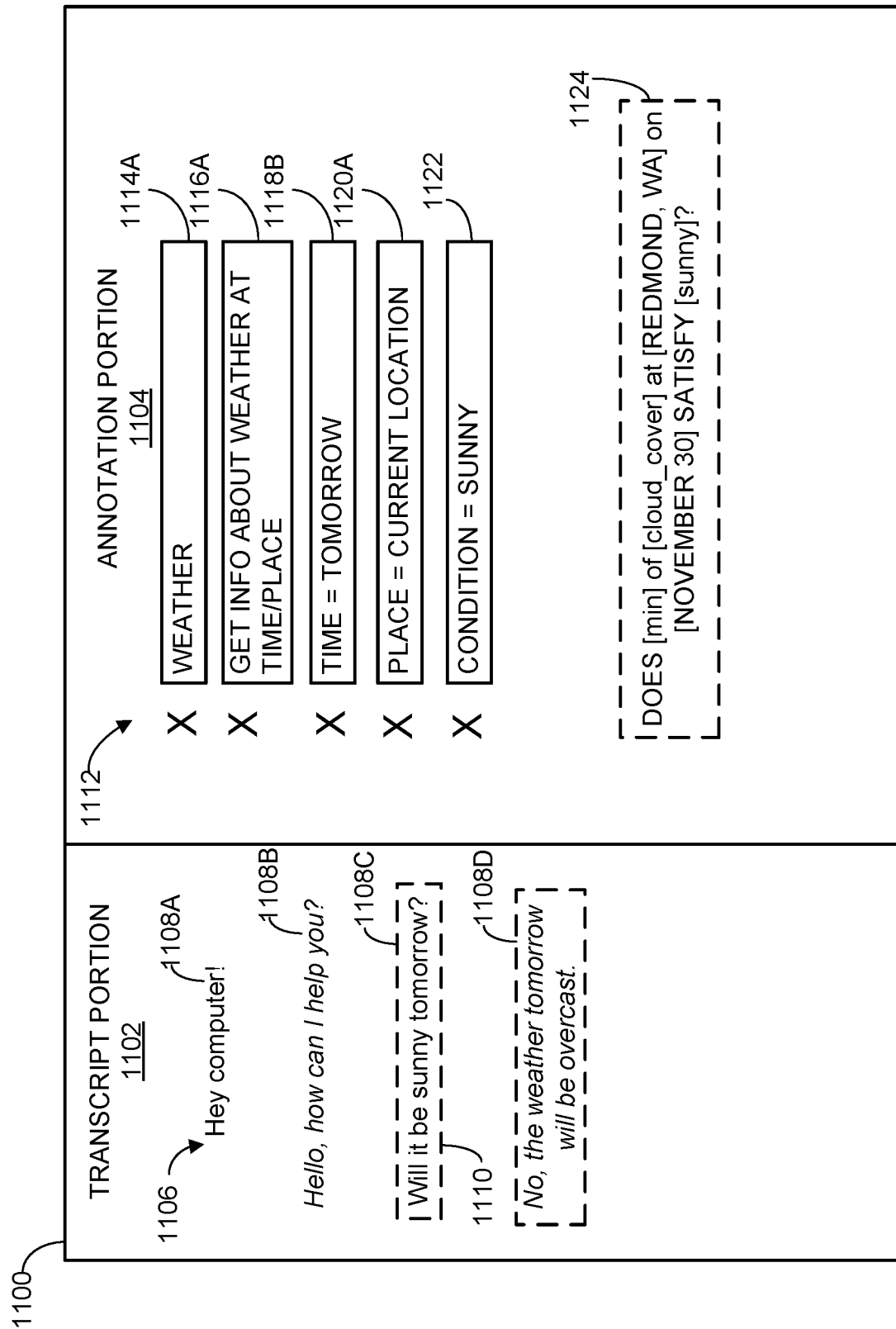

Turning now to FIG. 11E, the utterance annotation computing device has received computer inputs specifying multiple candidate utterance annotations, including an annotation 1118B defining the time as "tomorrow," an annotation 1120A defining the place as "current location," and an annotation 1122 defining the weather condition as "sunny." The selected utterance annotations collectively define a computer-readable interpretation 1124 of the example client utterance. Specifically, the example client utterance "Will it be sunny tomorrow?" has been interpreted as asking, based on the selected utterance annotations, "DOES [min] of [cloud_cover] at [REDMOND, Wash.] on [NOVEMBER 30] SATISFY [sunny]?" A substantially similar interpretation may be derived for other potential variations of the example client utterance, such as "For tomorrow, will the weather be sunny?" or "Tomorrow is supposed to be sunny, right?"

It will be understood that the specific syntax and format of the computer-readable interpretation of the example client utterance will vary depending on the implementation. Furthermore, the specific example shown in FIG. 11E uses syntax that is relatively human-readable, although this is done only for the sake of illustration. In alternative scenarios, the computer-readable interpretation need not be displayed on the utterance annotation interface, and additionally or alternatively may use any suitable syntax based on, for instance, a computer scripting or programming language, a novel or established data annotation schema, etc.

Although FIGS. 11A-11E show a single particular interpretation of a dialogue in which a worker selects a command representing a system utterance forming a portion of a larger conversation, alternately or additionally, a worker may be tasked with selecting a command representing a portion of dialogue including user utterances, system utterances, and/or other system actions, or even a command representing a whole dialogue. For example, the dialogue shown in interface 1100 may be alternately represented by a single command as in FIG. 6.

After receiving the computer inputs specifying the utterance annotations, the utterance annotation computing device may in some cases display a computerized assistant response to the example client utterance based on the one or more utterance annotations. This is also shown in FIG. 11E, in which another dialogue event 1108D has been added to the unannotated transcript 1106 shown in transcript portion 1102. Dialogue event 1108D takes the form of a computerized assistant response to the example client utterance. In this case, the computerized assistant response is computer-generated, and may be generated by the utterance annotation computing device (e.g., by a computerized assistant application running on the device), and/or generated by a remote device, such as server 206 shown in FIG. 2. Furthermore, in some cases, generating and displaying the computerized assistant response to the example client utterance includes communicating with a remote service to retrieve information requested in the example client utterance. For instance, to generate dialogue event 1108D, a computing device may access a remote weather service to determine whether it is predicted to be sunny at the specified time and place.

In some situations, the utterance annotation computing device may receive computer inputs that specify unsuitable utterance annotations for a particular client utterance. For example, a novice or distracted human annotator may inadvertently select inappropriate utterance annotations that collectively define an inaccurate computer-readable interpretation of the example client utterance. Accordingly, displaying a computerized assistant response to the example client utterance that is generated based on the selected utterance annotations, as is shown in FIG. 11E, may serve as a safeguard against incorrect annotations. This is due to the fact that a computerized assistant response generated based on improper utterance annotations will likely be incompatible with the example client utterance, for instance including information that was not requested. Accordingly, after displaying the computerized assistant response to the example client utterance, the utterance annotation computing device may in some cases receive one or more computer inputs that modify the selected utterance annotations. This may be done to address inconsistencies between the example client utterance and the computerized assistant response.

To mitigate the risk of a human annotator providing incorrect utterance annotations, the utterance annotation computing device may in some cases be configured to provide a modified, training-mode version of the utterance annotation interface. Such an interface may operate in a substantially similar manner as described above with respect to FIGS. 11A-11E, with the exception that the computer-readable interpretations of any example client utterances annotated in training mode are already known. In other words, as utterance annotations are selected, the utterance annotation computing device may determine whether the utterance annotations selected by a human annotator are consistent with the correct computer-readable interpretation of the example client utterance. Should an inconsistency be detected, either as the human annotator is selecting utterance annotations or once the annotator indicates that annotation is complete, the utterance annotation interface may display an error or other notification that incorrect utterance annotations were chosen. In this manner, human annotators may be provided immediate feedback as the human annotators learn to use the utterance annotation interface, thus decreasing the time it takes the human annotators to become proficient.

Returning again to FIG. 10, at 1008, method 1000 includes outputting, to a data store, an annotated utterance based on the example client utterance and each of the one or more selected utterance annotations. As one example, the annotated utterance may be output to data store 208 shown in FIG. 2, which may comprise a database of annotated utterances that each have a predetermined format usable to train a computerized assistant. It will be understood that the data store may take any suitable form and may be stored on any suitable device, including the utterance annotation device and/or one or more remote devices. Furthermore, the annotated utterance may have any suitable predetermined format. As one example, the annotated utterance may take the form of a JavaScript Object Notation (JSON) file, although other suitable file formats may be used as will be described in more detail below.

Figure 12:
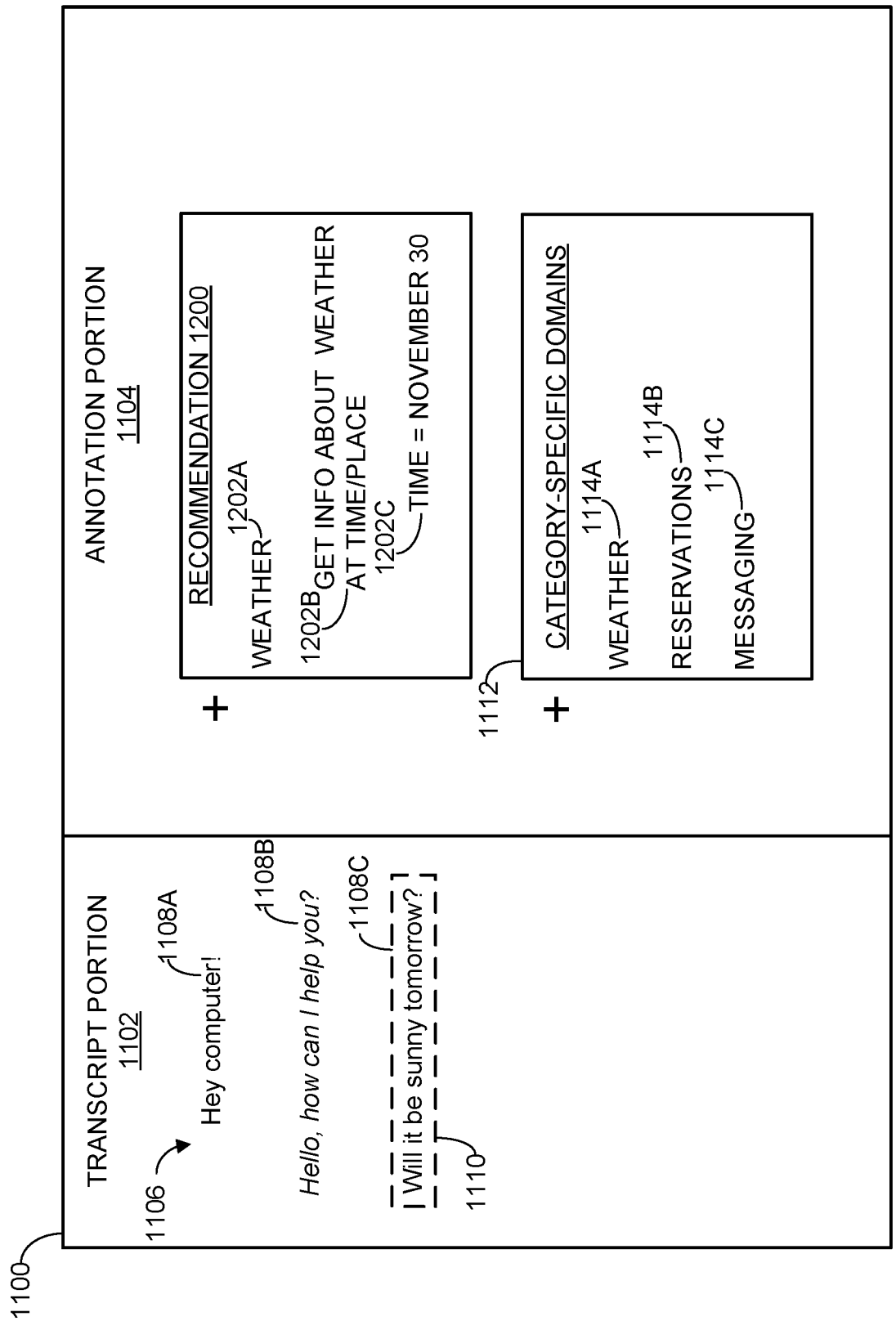
FIG. 12 illustrates an example utterance annotation interface including a recommendation of a category-specific domain.

Turning now to FIG. 12, in some cases the utterance annotation interface may automatically display a recommendation including one or more suggested category-specific domains that are identified based on detected keywords in the example client utterance. Such a recommendation may additionally or alternatively include one or more candidate utterance annotations that are similarly identified based on detected keywords in the example client utterance. In other words, as the utterance annotation computing device receives computer inputs selecting category-specific domains, subdomains, and utterance annotations, and/or before any such computer inputs are received, the device may automatically identify any category-specific domains, subdomains, or candidate utterance annotations that are predicted to be relevant to the example client utterance.

For example, FIG. 12 again shows utterance annotation interface 1100. In this case, however, the interface also includes a recommendation 1200 displayed in the annotation portion that recommends various category-specific domains, subdomains, and utterance annotations 1202A-1202C. Such recommendations may be made on the basis of detected keywords in the example client utterance. As one example, the "weather" domain may be recommended based on the keyword "sunny," while the "time=November 30" annotation may be suggested based on the word "tomorrow." It will be understood, however, that such recommendations may be made in any suitable way and on any suitable basis.

As indicated above, the unannotated transcript displayed in the transcript portion of the utterance annotation interface may include any number of dialogue events in an ordered sequence and may include any number of example client utterances for annotation. For example, in addition to a first example client utterance as described above, a dialogue event in the unannotated transcript may take the form of a second example client utterance that occurs later in the ordered sequence. In some scenarios, the second example client utterance may refer back to (e.g., modify) the first example client utterance. This is illustrated in FIG. 13, which again shows utterance annotation interface 1100. In this case, the unannotated transcript includes a second example client utterance 1300 taking the form of dialogue event 1108E. The second example client utterance refers back to the first example client utterance 1110 by modifying the query "Will it be sunny tomorrow?" with "How about the next day?"

Figure 13:
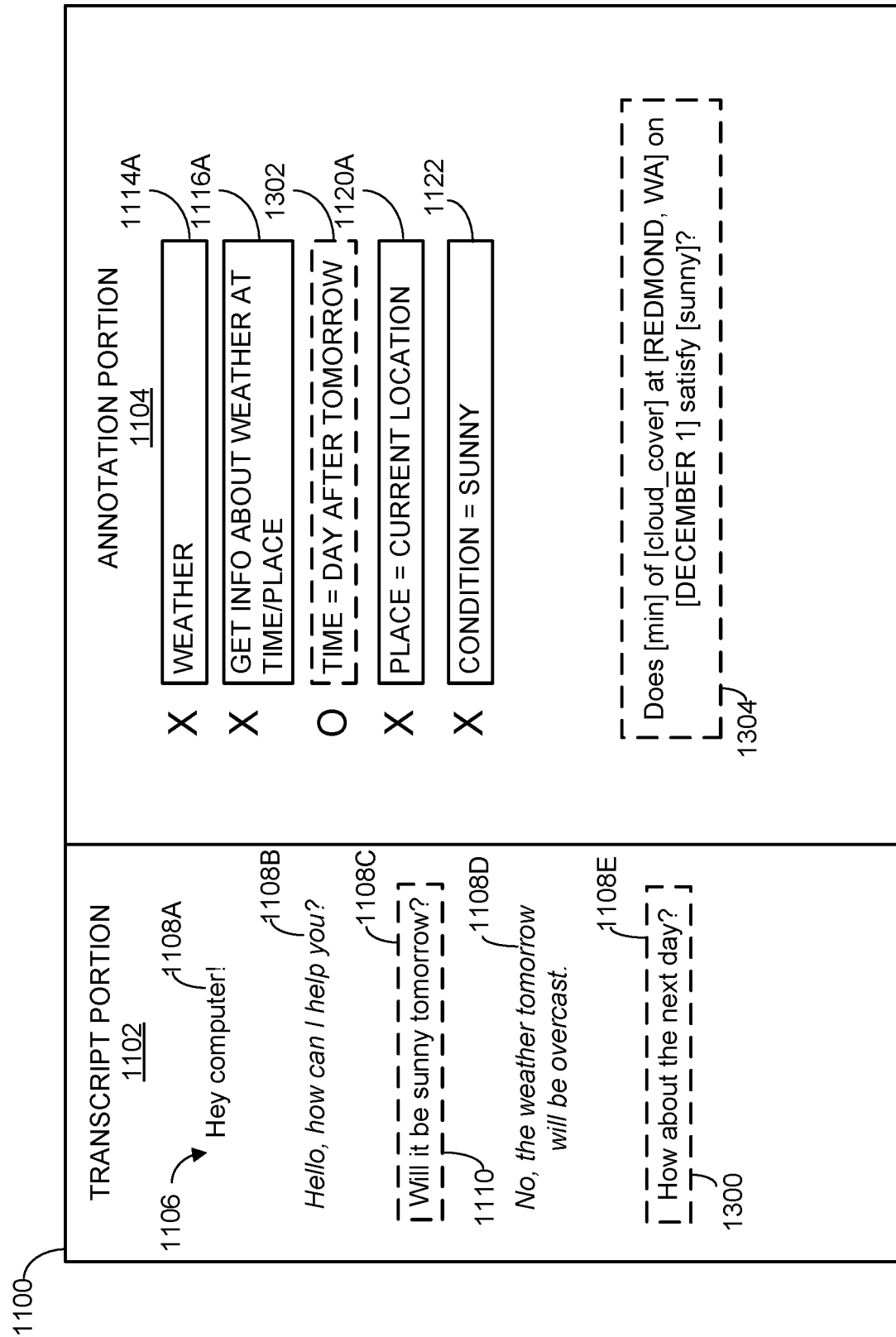
FIG. 13 illustrates annotation of a second example client utterance via an example utterance annotation interface.

Accordingly, the utterance annotation computing device may receive, for one or more response parameters in the second example client utterance (e.g., "the next day"), one or more computer inputs selecting one or more utterance annotations from the hierarchical menu that collectively define a computer-readable interpretation of the second example client utterance. The utterance annotations selected for the second example client utterance may in some cases modify the one or more utterance annotations selected for the first example client utterance, such as when the second example client utterance refers back to or modifies the first example client utterance. This is also shown in FIG. 13, in which one of the utterance annotations selected for example client utterance 1110 has been modified for second example client utterance 1300. Specifically, the "tomorrow" utterance annotation has been replaced with a "day after tomorrow" utterance annotation. Based on the modified set of utterance annotations, the utterance annotation interface displays a computer-readable interpretation 1304 for the second example client utterance.

Thus far, the computerized assistant responses to the example client utterances discussed herein have been computer-generated, either by the utterance annotation computing device or by other devices as discussed above. However, in some implementations, all or part of a computerized assistant response to a particular client utterance may be manually specified via computer inputs to the utterance annotation computing device—for instance, by a human annotator who selected utterance annotations for the client utterance.

This is illustrated in FIG. 14, which again shows utterance annotation interface 1100. In this example, however, the annotation portion of the interface includes an input window 1400 usable to specify a computerized assistant response to the example client utterance. The computerized assistant response may be specified in any suitable way. As one example, the computerized assistant response may be manually written by the human annotator, for instance by typing on a keyboard or vocalizing the response. In other examples, however, all or part of the computerized assistant response may be computer-generated under manual supervision. For instance, the computing device may generate a partial computerized assistant response and ask the human annotator to manually complete the rest of the response. Any computer-generated portions of the computerized assistant response may be manually approved by the human annotator.

Figure 14:
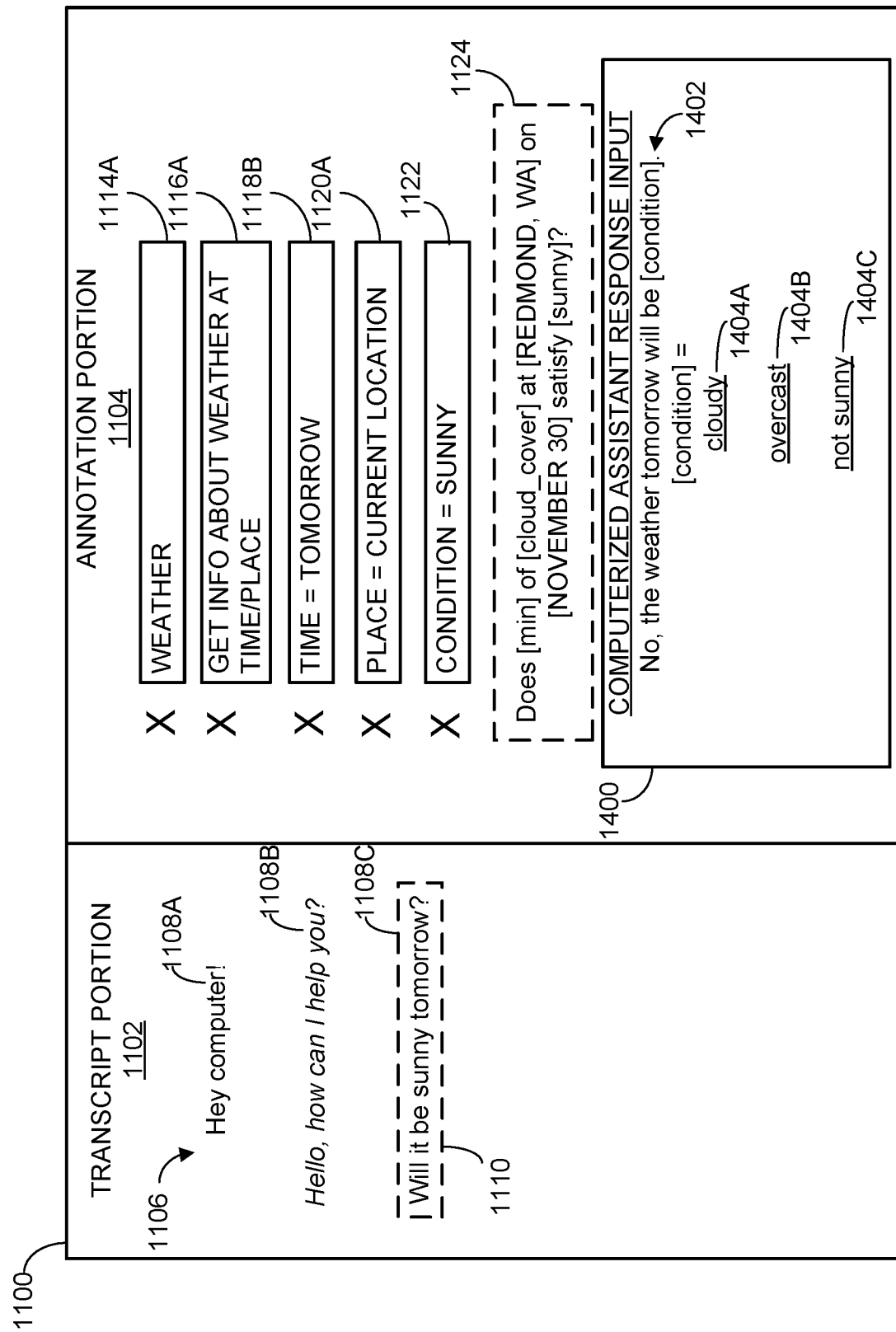
FIG. 14 illustrates generation of a computerized assistant response via an example utterance annotation interface.

Furthermore, in some cases, the computing device may automatically generate multiple candidate portions of the computerized response, and the computing device may receive one or more computer inputs that select from among the multiple candidate portions. This is illustrated in FIG. 14, in which the computing device has automatically generated multiple candidate portions 1404A-1404C for a partial computerized assistant response 1402. The computing device may then receive a computer input that selects one of the candidate portions (e.g., candidate portion 1404B) and completes the computerized assistant response. It will be understood, however, that the computerized assistant response may be generated in any suitable way and include any combination of computerized and manual generation. Once generated, the computerized assistant response may be output to a data store, from which it may be used to train the computerized assistant. The computerized assistant response may be included as part of the annotated utterance described above, and/or output separately.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources. A variety of different computer languages, compilers, data structures, etc. may be used. For example, computer-readable commands (e.g., utterance annotations) may be stored and/or accessed in the form of any suitable computer data structure for representing programming language syntax, control and/or data flow, and/or hierarchical structure (e.g., graph data structures, tree data structures, etc.). In some examples, the computer-readable command may be a plain-text command with text content adhering to a pre-defined syntax. In some examples, the computer-readable command may be stored as a JavaScript Object Notation (JSON) file. In some examples, the computer-readable command may be defined in a syntax supporting variable parameter names. In some examples, the computer-readable command may be defined to include one or more sub-commands.

Semantic parameters may be text or any other suitable structured data (e.g., binary data) for representing semantic values that may be relevant to the semantics of a dialogue described by a command. Semantic parameters may be defined using primitive data types (e.g., text, floating point number, integer), enumerative data types such as pre-defined lists of color names or airport names, and/or any other structured data that may be represented in the command language syntax (e.g., in JSON). Computer-readable commands may have input/output types determined by types of semantic parameters and/or sub-commands, e.g., a computer-readable command may have an input/output type indicating that it requires a parameter indicating a type of weather, and that it outputs a Boolean value.

In some examples, computer-readable commands, sub-commands, and/or semantic parameters may be given names, so as to be stored/accessed in an indexed fashion. For example, sub-commands, and/or semantic parameters may be included in multiple different commands. Commonly-included sub-commands and/or semantic parameters may be stored only once and referred to by name within commands that include them. Accordingly, storing commands, sub-commands and/or semantic parameters may improve efficiency of storage and retrieval for computer-readable commands. In some examples, commands and/or parameters may be additionally or alternatively indexed based on input/output types and parameter types. Accordingly, commands and/or parameters may be retrieved based on matching the input/output types and parameter types. Indexing commands and/or parameters based on input/output types may facilitate efficient retrieval of alternative commands that may pertain to a dialogue (e.g., by retrieving a plurality of commands that have a same or similar input/output type), efficient retrieval of alternative semantic parameters having a common type (e.g., for retrieving alternative semantic parameters that could be used to replace a semantic parameter). In some examples, commands may be indexed based on domain metadata indicating a domain of usage (e.g., "weather," "restaurants," and the like). Name, type, and/or domain metadata may facilitate efficient retrieval of relevant computer-readable commands, sub-commands, and/or semantic parameters, for example: for presenting commands to a human annotator during interactive repair; for finding relevant commands and/or sub-commands to present to a human annotator for constructing an annotation for an utterance; for generating alternative semantic parameters for replacing a seed semantic parameter to generate annotated utterances for use as training data; etc.

Dialogue transcripts, transcript portions, and individual utterances may be stored/accessed in the form of any suitable computer data structure, e.g., plain-text or JSON. For example, individual utterances may be stored as plain-text representing natural language content. Transcript portions and/or dialogue transcripts include one or more individual utterances in an ordered sequence. In general, transcript portions may be represented using the same data structures and the following description regarding dialogue transcripts also applies to transcript portions. Dialogue transcripts may include multiple individual utterances in the form of a collection data structure, concatenated sequence of utterances separated by delimiters, etc. Utterances may be marked as arising from a computerized assistant or client. In some examples, a transcript may include interaction by more than two entities (e.g., a computerized assistant and two different clients), and accordingly the transcript may be marked to indicate speaker identity for each utterance. In some examples, dialogue transcripts may include time-stamps or other time information indicating a temporality of the individual utterances. Optionally, in some examples, in addition to utterances, a transcript may further indicate actions performed by a computerized assistant, other inputs to the computerized assistant (e.g., camera input, keyboard input, etc.), or any other suitable information relating to the dialogue. Whether stored as plain-text, JSON, or another data structure, dialogue transcripts and/or transcript portions may be displayed as an organized/ordered sequence of utterances. The displayed sequence of utterances may be laid-out and/or annotated (e.g., color coded) in any suitable fashion to indicate speaker identity for each utterance. Even when a dialogue transcript includes information other than utterances (e.g., computer-readable commands, time-stamps, etc.), optionally when displaying the utterance, such other information may be omitted so that only the utterances are displayed.

Although the present disclosure primarily describes annotation with regard to single utterances, the techniques disclosed herein may be similarly applied to acquire annotations for transcript portions or whole dialogue transcripts. Accordingly, as used herein, "annotated utterance" may refer to a single annotated utterance, as well as to an annotated transcript of one or more utterances. A computer-readable label (e.g., one or more utterance annotations) specified by a human annotator may be associated with any suitable portion of a dialogue transcript and/or with any single utterance within a dialogue transcript, to indicate how the label pertains to that specific portion/utterance. Accordingly, acquiring a computer-readable label from a human annotator may include storing a new annotated utterance linking the utterance annotation to a particular transcript portion/utterance that the human annotator was shown during annotation. Accordingly, each computer-readable label may be stored/accessed/retrieved in association with the particular utterances.

An annotated utterance includes one or more utterances, along with an annotation in the form of a computer-readable label useable for machine learning training. In some examples, the computer-readable label is a computer-readable command as described above. Annotated utterances and/or annotated dialogue transcripts may be stored in any suitable format. In some examples, annotated utterances may be represented by storing one or more computer-readable labels in an indexed fashion with an index based on one or more utterances (e.g., a hash value of the one or more utterances). Accordingly, the associated dialogue transcript may be used as an index to look up the computer-readable labels for the one or more utterances, thereby facilitating efficient retrieval of labels. Alternately or additionally, annotated utterances may be stored as a collection of annotation-utterance pairs, wherein each pair includes a dialogue transcript component and a label component, and wherein the pairs are arranged in any suitable collection data structure. For example, when the computer-readable label is a computer-readable command, an annotated utterance may be represented as a JSON data structure including two JSON data structure components: 1) a dialogue transcript JSON data structure; and 2) a computer-readable command JSON data structure; similarly, a plurality of annotated utterances may be represented as a JSON data structure including an array containing a plurality of annotated utterance elements.

Figure 15:
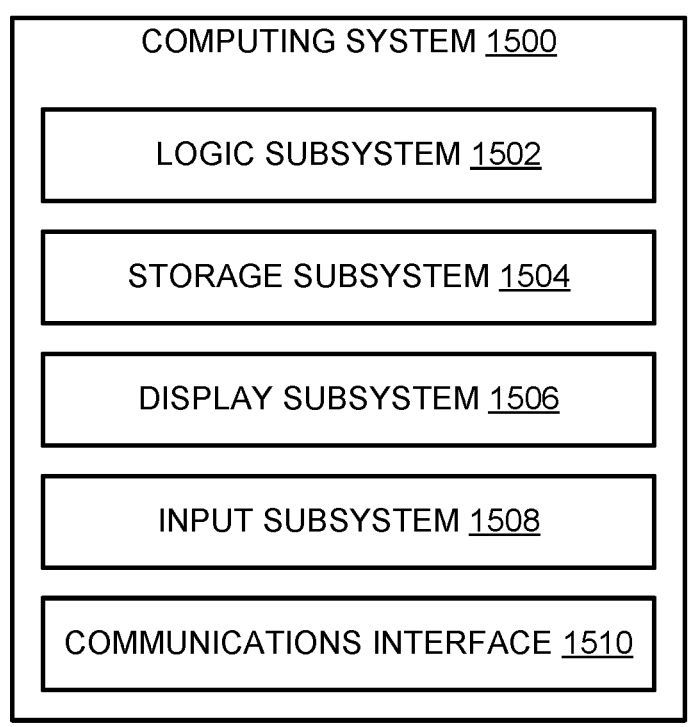
FIG. 15 schematically shows an example computing system.

FIG. 15 schematically shows a simplified representation of a computing system 1500 configured to provide any to all of the compute functionality described herein. Computing system 1500 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 1500 includes a logic subsystem 1502 and a storage subsystem 1504. Computing system 1500 may optionally include a display subsystem 1506, input subsystem 1508, communication subsystem 1510, and/or other subsystems not shown in FIG. 15.

Logic subsystem 1502 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1504 includes one or more physical devices configured to temporarily and/or permanently hold computer information such as data and instructions executable by the logic subsystem. When the storage subsystem includes two or more devices, the devices may be collocated and/or remotely located. Storage subsystem 1504 may include volatile, nonvolatile, dynamic, static, read/write, read-only, random-access, sequential-access, location-addressable, file-addressable, and/or content-addressable devices. Storage subsystem 1504 may include removable and/or built-in devices. When the logic subsystem executes instructions, the state of storage subsystem 1504 may be transformed—e.g., to hold different data.

Aspects of logic subsystem 1502 and storage subsystem 1504 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to hardware and any software, instructions, and/or other components cooperating with such hardware to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application) cooperating with a remote component (e.g., cloud computing service). The software and/or other instructions that give a particular machine its functionality may optionally be saved as an unexecuted module on a suitable storage device. For example, machines instantiated by the logic subsystem and storage subsystem include the machines shown in pipeline 300, e.g., seed dialogue acquisition machine 301, annotation acquisition machine 302, synthetic data generation machine 303, training machine 304, and deployed computerized assistant machine 305.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters.

Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

The methods and processes disclosed herein may be implemented using one or more language models. Language models may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future machine learning (ML) and/or artificial intelligence (AI) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user owning the data should be notified, and the user data should only be collected when the user provides affirmative consent. If data is to be collected, it can and should be collected with the utmost respect for user privacy. If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data.

Accordingly, the ML and/or AI components can and should be trained on diverse, representative datasets that include sufficient relevant data for diverse users and/or populations of users. In particular, training data sets should be inclusive with regard to different human individuals and groups, so that as ML and/or AI components are trained, their performance is improved with regard to the user experience of the users and/or populations of users.

For example, a dialogue system according to the present disclosure may be trained to interact with different populations of users, using language models that are trained to work well for those populations based on language, dialect, accent, and/or any other features of speaking style of the population.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components can and should be designed to provide context as to how they operate as much as is possible, so that implementers of ML and/or AI systems can be accountable for decisions/assessments made by the systems. For example, ML and/or AI systems should have replicable behavior, e.g., when they make pseudo-random decisions, random seeds should be used and recorded to enable replicating the decisions later. As another example, data used for training and/or testing ML and/or AI systems should be curated and maintained to facilitate future investigation of the behavior of the ML and/or AI systems with regard to the data. Furthermore, ML and/or AI systems can and should be continually monitored to identify potential bias, errors, and/or unintended outcomes.

When included, display subsystem 1506 may be used to present a visual representation of data held by storage subsystem 1504. This visual representation may take the form of a graphical user interface (GUI). Display subsystem 1506 may include one or more display devices utilizing virtually any type of technology. In some implementations, display subsystem may include one or more virtual-, augmented-, or mixed reality displays.

When included, input subsystem 1508 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1510 may be configured to communicatively couple computing system 1500 with one or more other computing devices. Communication subsystem 1510 may include wired and/or wireless communication devices compatible with one or more different communication protocols. The communication subsystem may be configured for communication via personal-, local- and/or wide-area networks.

In an example, a computing device comprises: a display configured to present a graphical user interface, the graphical user interface comprising: a transcript portion configured to display an unannotated transcript representing an ordered sequence of one or more dialogue events involving a client and a computerized assistant, at least one of the dialogue events taking the form of an example client utterance; and an annotation portion configured to display a hierarchical menu including a plurality of candidate utterance annotations; and an utterance annotation machine configured to: receive one or more computer inputs selecting, for each of one or more response parameters in the example client utterance, one or more utterance annotations from the hierarchical menu, the one or more selected utterance annotations collectively defining a machine-readable interpretation of the example client utterance; and output, to a data store, an annotated utterance based on the example client utterance and each of the one or more selected utterance annotations, the annotated utterance having a predetermined format usable to train the computerized assistant. In this example or any other example, the utterance annotation machine is further configured to receive a computer input to select, from the hierarchical menu of candidate utterance annotations, a category-specific domain that exposes a subset of the plurality of candidate utterance annotations related to the category-specific domain. In this example or any other example, the hierarchical menu of candidate utterance annotations includes a plurality of category-specific domains that are hierarchically nested, such that a particular category-specific domain is associated with one or more category-specific subdomains. In this example or any other example, the utterance annotation machine is further configured to automatically display a recommendation including one or more suggested category-specific domains that are identified based on detected keywords in the example client utterance. In this example or any other example, the recommendation further includes one or more suggested candidate utterance annotations identified based on detected keywords in the example client utterance. In this example or any other example, a dialogue event in the unannotated transcript takes the form of a second example client utterance occurring later in the ordered sequence than the example client utterance, and the second example client utterance refers back to the example client utterance. In this example or any other example, the utterance annotation machine is further configured to receive, for one or more response parameters in the second example client utterance, one or more computer inputs selecting one or more utterance annotations from the hierarchical menu defining a machine-readable interpretation of the second example client utterance and modifying the one or more selected utterance annotations for the example client utterance. In this example or any other example, the utterance annotation machine is further configured to, after receiving the one or more computer inputs selecting the one or more utterance annotations, generate and display a computerized assistant response to the example client utterance based on the one or more selected utterance annotations. In this example or any other example, the utterance annotation machine is further configured to, after generating and displaying the computerized assistant response to the example client utterance, receive one or more computer inputs modifying the one or more selected utterance annotations to address inconsistencies between the example client utterance and the computerized assistant response. In this example or any other example, generating and displaying the computerized assistant response to the example client utterance includes communicating with a remote service to retrieve information requested in the example client utterance. In this example or any other example, the utterance annotation machine is further configured to receive one or more computer inputs specifying a computerized assistant response to the example client utterance. In this example or any other example, the utterance annotation machine is further configured to, based on the one or more selected utterance annotations, automatically generate multiple candidate portions of the computerized assistant response, and the one or more computer inputs specifying the computerized assistant response select from among the multiple candidate portions. In this example or any other example, the predetermined format of the annotated utterance is a JavaScript Object Notation (JSON) file. In this example or any other example, the example client utterance is retrieved from a database of unannotated example client utterances.

In an example, a method comprises: graphically displaying an unannotated transcript representing an ordered sequence of one or more dialogue events involving a client and a computerized assistant, at least one of the dialogue events taking the form of an example client utterance; graphically displaying a hierarchical menu including a plurality of candidate utterance annotations; receiving one or more computer inputs selecting, for each of one or more response parameters in the example client utterance, one or more utterance annotations from the hierarchical menu, the one or more selected utterance annotations collectively defining a machine-readable interpretation of the example client utterance; and outputting, to a data store, an annotated utterance based on the example client utterance and each of the one or more selected utterance annotations, the annotated utterance having a predetermined format usable to train the computerized assistant. In this example or any other example, the utterance annotation machine is further configured to receive a computer input to select, from the hierarchical menu of candidate utterance annotations, a category-specific domain that exposes a subset of the plurality of candidate utterance annotations related to the category-specific domain. In this example or any other example, the hierarchical menu of candidate utterance annotations includes a plurality of category-specific domains that are hierarchically nested, such that a particular category-specific domain is associated with one or more category-specific subdomains. In this example or any other example, the method further comprises, after receiving the one or more computer inputs selecting the one or more utterance annotations, generating and displaying a computerized assistant response to the example client utterance based on the one or more selected utterance annotations. In this example or any other example, the method further comprises, after generating and displaying the computerized assistant response to the example client utterance, receiving one or more computer inputs modifying the one or more selected utterance annotations to address inconsistencies between the example client utterance and the computerized assistant response.

In an example, a computing device comprises: a display engine configured to present a graphical user interface on a display device, the graphical user interface comprising: a transcript portion configured to display an unannotated transcript representing an ordered sequence of one or more dialogue events involving a client and a computerized assistant, at least one of the dialogue events taking the form of an example client utterance; and an annotation portion configured to display a hierarchical menu including a plurality of candidate utterance annotations, each of the plurality of candidate utterance annotations being associated with one or more category-specific domains, such that selection of a category-specific domain exposes one or more candidate utterance annotations associated with the selected category-specific domain; and an utterance annotation machine configured to: receive one or more computer inputs selecting, for each of one or more response parameters in the example client utterance, one or more utterance annotations from the hierarchical menu, the one or more selected utterance annotations collectively defining a machine-readable interpretation of the example client utterance; generate and display a computerized assistant response to the example client utterance based on the one or more selected utterance annotations; receive one or more computer inputs modifying the one or more selected utterance annotations to address inconsistencies between the example client utterance and the computerized assistant response; and output, to a data store, an annotated utterance based on the example client utterance and each of the one or more selected utterance annotations, the annotated utterance having a predetermined format usable to train the computerized assistant.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
 a display configured to present a graphical user interface, the graphical user interface comprising:
  a transcript portion configured to display an unannotated transcript representing an ordered sequence of one or more dialogue events involving a client and a computerized assistant, at least one of the dialogue events taking the form of an example client utterance; and
  an annotation portion configured to display a hierarchical menu including a plurality of candidate utterance annotations; and
  an utterance annotation machine configured to:
   receive one or more computer inputs selecting, for each of one or more response parameters in the example client utterance, one or more utterance annotations from the hierarchical menu, the one or more selected utterance annotations collectively defining a machine-readable interpretation of the example client utterance; and
   output, to a data store, an annotated utterance based on the example client utterance and each of the one or more selected utterance annotations, the annotated utterance having a predetermined format usable to train the computerized assistant.

2. The computing device of claim 1, where the utterance annotation machine is further configured to receive a computer input to select, from the hierarchical menu of candidate utterance annotations, a category-specific domain that exposes a subset of the plurality of candidate utterance annotations related to the category-specific domain.

3. The computing device of claim 2, where the hierarchical menu of candidate utterance annotations includes a plurality of category-specific domains that are hierarchically nested, such that a particular category-specific domain is associated with one or more category-specific subdomains.

4. The computing device of claim 2, where the utterance annotation machine is further configured to automatically display a recommendation including one or more suggested category-specific domains that are identified based on detected keywords in the example client utterance.

5. The computing device of claim 4, where the recommendation further includes one or more suggested candidate utterance annotations identified based on detected keywords in the example client utterance.

6. The computing device of claim 1, where a dialogue event in the unannotated transcript takes the form of a second example client utterance occurring later in the ordered sequence than the example client utterance, and the second example client utterance refers back to the example client utterance.

7. The computing device of claim 6, where the utterance annotation machine is further configured to receive, for one or more response parameters in the second example client utterance, one or more computer inputs selecting one or more utterance annotations from the hierarchical menu defining a machine-readable interpretation of the second example client utterance and modifying the one or more selected utterance annotations for the example client utterance.

8. The computing device of claim 1, where the utterance annotation machine is further configured to, after receiving the one or more computer inputs selecting the one or more utterance annotations, generate and display a computerized assistant response to the example client utterance based on the one or more selected utterance annotations.

9. The computing device of claim 8, where the utterance annotation machine is further configured to, after generating and displaying the computerized assistant response to the example client utterance, receive one or more computer inputs modifying the one or more selected utterance annotations to address inconsistencies between the example client utterance and the computerized assistant response.

10. The computing device of claim 8, where generating and displaying the computerized assistant response to the example client utterance includes communicating with a remote service to retrieve information requested in the example client utterance.

11. The computing device of claim 1, where the utterance annotation machine is further configured to receive one or more computer inputs specifying a computerized assistant response to the example client utterance.

12. The computing device of claim 11, where the utterance annotation machine is further configured to, based on the one or more selected utterance annotations, automatically generate multiple candidate portions of the computerized assistant response, and where the one or more computer inputs specifying the computerized assistant response select from among the multiple candidate portions.

13. The computing device of claim 1, where the predetermined format of the annotated utterance is a JavaScript Object Notation (JSON) file.

14. The computing device of claim 1, where the example client utterance is retrieved from a database of unannotated example client utterances.

15. A method, comprising:
graphically displaying an unannotated transcript representing an ordered sequence of one or more dialogue events involving a client and a computerized assistant, at least one of the dialogue events taking the form of an example client utterance;
graphically displaying a hierarchical menu including a plurality of candidate utterance annotations;
receiving one or more computer inputs selecting, for each of one or more response parameters in the example client utterance, one or more utterance annotations from the hierarchical menu, the one or more selected utterance annotations collectively defining a machine-readable interpretation of the example client utterance; and
outputting, to a data store, an annotated utterance based on the example client utterance and each of the one or more selected utterance annotations, the annotated utterance having a predetermined format usable to train the computerized assistant.

16. The method of claim 15, where the utterance annotation machine is further configured to receive a computer input to select, from the hierarchical menu of candidate utterance annotations, a category-specific domain that exposes a subset of the plurality of candidate utterance annotations related to the category-specific domain.

17. The method of claim 16, where the hierarchical menu of candidate utterance annotations includes a plurality of category-specific domains that are hierarchically nested, such that a particular category-specific domain is associated with one or more category-specific subdomains.

18. The method of claim 15, further comprising, after receiving the one or more computer inputs selecting the one or more utterance annotations, generating and displaying a computerized assistant response to the example client utterance based on the one or more selected utterance annotations.

19. The method of claim 15, further comprising, after generating and displaying the computerized assistant response to the example client utterance, receiving one or more computer inputs modifying the one or more selected utterance annotations to address inconsistencies between the example client utterance and the computerized assistant response.

20. A computing device, comprising:
a display engine configured to present a graphical user interface on a display device, the graphical user interface comprising:
a transcript portion configured to display an unannotated transcript representing an ordered sequence of one or more dialogue events involving a client and a computerized assistant, at least one of the dialogue events taking the form of an example client utterance; and
an annotation portion configured to display a hierarchical menu including a plurality of candidate utterance annotations, each of the plurality of candidate utterance annotations being associated with one or more category-specific domains, such that selection of a category-specific domain exposes one or more candidate utterance annotations associated with the selected category-specific domain; and
an utterance annotation machine configured to:
receive one or more computer inputs selecting, for each of one or more response parameters in the example client utterance, one or more utterance annotations from the hierarchical menu, the one or more selected utterance annotations collectively defining a machine-readable interpretation of the example client utterance;

generate and display a computerized assistant response to the example client utterance based on the one or more selected utterance annotations;

receive one or more computer inputs modifying the one or more selected utterance annotations to address inconsistencies between the example client utterance and the computerized assistant response; and output, to a data store, an annotated utterance based on the example client utterance and each of the one or more selected utterance annotations, the annotated utterance having a predetermined format usable to train the computerized assistant.

* * * * *